US010685258B2

(12) United States Patent
Miyajima et al.

(10) Patent No.: US 10,685,258 B2
(45) Date of Patent: Jun. 16, 2020

(54) IMAGE PROCESSING APPARATUS, PROGRAM, AND RADIOGRAPHIC IMAGING APPARATUS

(71) Applicant: Shimadzu Corporation, Kyoto (JP)

(72) Inventors: Takahiro Miyajima, Kyoto (JP); Junya Yamamoto, Kyoto (JP); Kazuyoshi Nishino, Kyoto (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 91 days.

(21) Appl. No.: 16/009,684

(22) Filed: Jun. 15, 2018

(65) Prior Publication Data
US 2019/0385015 A1  Dec. 19, 2019

(51) Int. Cl.
*G06K 9/62* (2006.01)
*G06T 7/70* (2017.01)
*G06T 5/00* (2006.01)
*G06T 7/11* (2017.01)

(52) U.S. Cl.
CPC ............ *G06K 9/6228* (2013.01); *G06T 5/008* (2013.01); *G06T 7/11* (2017.01); *G06T 7/70* (2017.01); *G06K 2209/051* (2013.01); *G06T 2207/10116* (2013.01); *G06T 2207/30061* (2013.01)

(58) Field of Classification Search
CPC .. G06K 9/6228; G06K 2209/051; G06T 7/11; G06T 7/70; G06T 5/008; G06T 2207/10116; G06T 2207/30061
See application file for complete search history.

(56) References Cited

U.S. PATENT DOCUMENTS 5,987,345 A * 11/1999 Engelmann ........... G06F 19/321
                                                  600/407
2007/0086639 A1* 4/2007 Sakaida ................ G06T 7/0012
                                                  382/132

FOREIGN PATENT DOCUMENTS

| JP | H03-218578 A | 9/1991 |
| JP | 2000-023950 A | 1/2000 |
| JP | 2005-161061 A | 6/2005 |
| JP | 2005-354201 A | 12/2005 |
| JP | 2008-259522 A | 10/2008 |
| JP | 2015-100593 | 6/2015 |

OTHER PUBLICATIONS

Machine translation for JP H03-218578, IDS (Year: 1999).*
Notification of Reasons for Refusal dated Feb. 26, 2019 in corresponding Japanese Patent Application No. JP2015-240306.

* cited by examiner

*Primary Examiner* — Qian Yang
(74) *Attorney, Agent, or Firm* — Muir Patent Law, PLLC

(57) ABSTRACT

According to the present invention, a total value profile to be used for searching a lung field end is generated based on a radiation image. A pacemaker and an annotation reflected in a radiation image are merely reflected darkly in the image, and the existence is not particularly emphasized by edge enhancement. Therefore, the total value profile according to the present invention is not significantly affected by a pacemaker and/or an annotation. Therefore, according to the present invention, there occurs no false recognition regarding the end of the lung field due to a pacemaker and/or an annotation.

4 Claims, 30 Drawing Sheets

X-ray image (original image P0)

Radiation image (original image)

IMAGE PROCESSING APPARATUS, PROGRAM, AND RADIOGRAPHIC IMAGING APPARATUS

TECHNICAL FIELD

The present invention relates to an image processing apparatus, a program, and a radiographic imaging apparatus capable of improving visibility of a part of a radiation image.

BACKGROUND ART

FIG. 51 shows a radiation image captured by a radiographic imaging apparatus.

In order to observe a lung field of a subject reflected in such a radiation image, it is necessary to adjust the contrast of the lung field to improve the visibility of the lung field.

In the radiation image, various portions of the subject, such as bony parts, other than a lung field, are reflected. The bony part of the subject is darkly reflected in the radiation image because the body part hardly transmits radiation. Furthermore, the portion outside the contour of the subject reflected in the radiation image is a portion where the subject is not reflected but the air is reflected. The portion where the subject is not reflected is brightly reflected in the radiation image because there is nothing to absorb radiation. In the radiation image, the lung field is brighter than the bony part of the object but darker than the portion outside the contour of the subject, which is the portion where the air is reflected.

The lung field of the radiation image totally looks to be filled with a gray color with poor contrast. This is because the pixels located in the lung field reflected in the radiation image have similar pixel values.

When the contrast adjustment is executed for the entire radiation image for the purpose of increasing the visibility of the lung field, the contrast adjustment is also executed for the portions of the radiation image in which the bony parts and the air are reflected. Although such a contrast adjustment may increase the visibility of the radiation image as a whole, as far as the lung field is concerned, there is not so much improvement in visibility. The lung field after the contrast adjustment is still in a totally poor contrast state. This is because that, in the case of expressing the contrast of the lung field, low pixel values are used to express the bony parts of the subject and high pixel values are used to express the portion where the air is reflected, and therefore the lung field should be expressed with the remaining moderate pixel values.

Therefore, a method of making a contrast adjustment only on a lung field in a radiation image has been conventionally conceived. According to this method, since the lung field can be expressed with more various color tones, the visibility of the lung field is assuredly increased. In this method, trimming is performed to extract the lung field in the radiation image, and a contrast adjustment is executed on the trimmed image in which the lung field is largely reflected. In the trimmed image, dark bony portions of the subject and bright portions where the air is reflected are excluded, so the trimmed image is not affected by these portions.

A conventional lung field trimming method will be described. In a conventional method, first, edge enhancement processing is performed on a radiation image as shown in FIG. 52. The edge enhancement processing is image processing that can be realized by spatial processing such as differentiation processing and darkly expresses portions where the pixel value in the image changes extremely. By using this edge enhancement processing, the contour of the subject can be grasped. The edge enhancement is detailed in Patent Document 1.

According to a conventional method, trimming processing of trimming the area including a lung field as shown in FIG. 53 is performed based on a contour of a lung field. In the trimming processing at this time, the lung field area is recognized based on the edge enhanced image, and the lung field including its periphery is roughly extracted from the radiation image.

A conventional trimming processing using the edge enhanced image is performed by generating the profile as shown in FIG. 54 based on the edge enhanced image. The profile is a profile showing the relation between the total value obtained by adding pixel values of each pixel array obtained by decomposing the edge enhanced image into pixel columns each having a width corresponding to one pixel and the position of each pixel array. The profile is generated by decomposing the edge enhanced image into pixel columns extending in the vertical direction, and shows the relation between the position in the image in the horizontal direction and the total value of the pixel value.

Observing this profile, it is found that there are parts where the total value is extremely high. This part shows an existence position of a pixel column where there exist many pixels having high luminance pixel value in the edge enhanced image. In the edge enhanced image, the high luminance pixel value means the portion where the change of the pixel value is severe in the original image. Therefore, by finding the part whose total value is extremely high in the profile, it is possible to know the portion in the original image where the pixel is suddenly changed.

In reality, in the original image, the pixel value in the vicinity of the lung field contour is a part where the pixel value changes dramatically. The part where the total value of the profile is extremely high represents the position of the lung field contour in the original image. The portion where the total value appeared in the profile is extremely high represents the right end or the left end of the lung field contour. By analyzing such a profile, a trimmed image roughly cut out the lung field area from the original image can be obtained.

The position of the upper end of the lung field contour and that of the lower end thereof can also be obtained by analyzing the edge enhanced image.

By performing the contrast adjustment by using the luminance information of the rectangular area of the lung field searched as shown in FIG. 55, the genuineness of the lung field is assuredly improved.

PRIOR ART

Patent Document

Patent Document 1: Japanese Unexamined Patent Application Publication No. 2015-100593

SUMMARY OF THE INVENTION

Problems to be Solved by the Invention

However, conventional image processing has the following problems. That is, according to a conventional configuration, erroneous recognition of the contour of the lung field occurs, which results in a failure of the trimmed image generation processing described with reference to FIG. 53.

In a conventional image processing using an edge enhanced image, the subject image is predicted, and based on this prediction, trimming is performed around the lung field. Therefore, according to a conventional method, the operation can be performed normally with respect to a radiation image in which a normal subject image is reflected.

However, in a conventional configuration, if an unexpected image is reflected in a radiation image, erroneous recognition of the contour of the lung field is likely to occur. The unexpected image denotes, for example, a projection image of a cardiac pacemaker embedded in a subject as shown in the radiation image in FIG. 56. A cardiac pacemaker contains metal and is reflected relatively dark in the radiation image. A cardiac pacemaker is usually reflected in such a manner as to be overlapped with the lung field.

When edge enhancement processing is performed on such a radiation image, the contour of the cardiac pacemaker is emphasized as shown in FIG. 56. In a conventional method, when a cardiac pacemaker is reflected in a radiation image, there occurs a false recognition that this portion is the contour of the subject. As a result, a trimmed image in which a part of the lung field is cut out as shown in FIG. 57 will be generated. It is impossible to get the contour of the entire lung field from such a trimmed image.

Further, if an annotation is reflected in the radiation image, trimming of the radiation image will not be performed correctly. The aforementioned annotation denotes a letter, such as, e.g., "R", added by synthesis in the upper portion of the radiation image obtained by imaging as shown in FIG. 58. This annotation is normally reflected outside the lung field.

When edge enhancement processing is performed on such a radiation image, the contour of the annotation is emphasized as shown in FIG. 58. In a conventional method, when an annotation is reflected in a radiation image, there occurs a false recognition that this portion is the contour of the subject. As a result, a trimmed image including the portion outside the contour of the subject as shown in FIG. 59 will be generated. It is difficult to accurately obtain the contour of the lung field from such a trimmed image.

The present invention has been made in view of the aforementioned circumstances, and aims to provide an image processing apparatus capable of assuredly improving visibility of a lung field by assuredly recognizing a position of a lung field reflected in a radiation image.

Means for Solving the Problems

In order to solve the aforementioned problems, the present invention has the following configuration.

That is, an image processing apparatus according to the present invention is configured to identify a lung field area in a radiation image in which a lung field of a subject is reflected in a vertical direction, the image processing apparatus comprising: (A1) lateral direction profile generation means configured to generate a lateral direction profile by adding or averaging pixel values belonging to each pixel column of the radiation image for each pixel column; and (B1) lung field end identifying means configured to identify a position where a value of the lateral direction profile becomes minimum in a right side area or a left side area except for the vicinity of a center of a predetermined width from the radiation image as a right end or a left end of the lung field area.

[Functions and Effects]

According to the present invention, a position of a lung field reflected in a radiation image can be assuredly recognized, so that visibility of a lung field can be assuredly improved. That is, according to the present invention, instead of generating a total value profile based on an edge enhanced image like a conventional art, it is configured to generate a total value profile based on a radiation image.

In an edge enhanced image, a contour of a pacemaker or a contour of an annotation are very strongly emphasized. Therefore, based on the edge enhanced image, the total value profile is greatly affected by the pacemaker and the annotation. This means that the shape of the total value profile greatly changes depending on the presence or absence of the pacemaker and/or the annotation. The pacemaker and the annotation become a cause of misunderstanding of the edge of the lung field.

In comparison, according to the present invention, a total value profile is generated based on a radiation image. A pacemaker and/or an annotation reflected in a radiation image is merely reflected darkly in an image, and the existence is not particularly emphasized by edge enhancement. Therefore, the total value profile according to the present invention is not significantly affected by a pacemaker and/or an annotation. Therefore, according to the present invention, there occurs no false recognition regarding an end of a lung field due to a pacemaker and/or an annotation.

Further, in the aforementioned image processing apparatus, it is more preferable that the predetermined width in the lung field end identifying means be a width avoiding the vertebras of the subject reflected as a vertically elongated line near the center of the radiation image.

[Functions and Effects]

The aforementioned description describes a more specific configuration of the present invention. When the area is set so as to avoid the vertebras of the subject, false recognition of the edge of the lung field will not occur due to the influence of the vertebras.

Further, an image processing apparatus according to the present invention configured to identify a lung field area in a radiation image in which a lung field of a subject is reflected in a vertical direction, includes: (A2) vertical direction profile generation means configured to generate a vertical direction profile by adding or averaging pixel values belonging to each pixel row of the radiation image for each pixel row; and (B2) lung field end identifying means configured to identify a position where a value of a vertical direction profile becomes minimum in an upper side area of the radiation image as an upper side end of the lung field area.

[Functions and Effects]

The present invention can also be applied to recognition of an upper end of a lung field.

Further, in the aforementioned image processing apparatus, it is more preferable that the lung field end identifying means set an upper side area by excluding a jaw of the subject.

[Functions and Effects]

The aforementioned description more specifically shows the constitution of the present invention. By setting the upper side area so as to exclude the jaw of the subject, false recognition of the upper end of the lung field will not occur due to the jaw of the subject.

An image processing apparatus according to the present invention configured to identify a lung field area in a radiation image in which a lung field of a subject is reflected in a vertical direction, the image processing apparatus includes: (A2) vertical direction profile generation means configured to generate a vertical direction profile by adding or averaging pixel values belonging to each pixel row of the radiation image for each pixel row; and (B3) lung field end identifying means configured to identify a position where a change of a value of a vertical direction profile is maximum in a lower side area including a lower end of a lung field reflected in the radiation image as a lower end of the lung field area, wherein the lung field end identifying means recognizes a lower end of the left lung and a lower end of the right lung and compares a position of the lower end of the left lung in the image with a position of the lower end of the right lung to recognize a position which is positioned lower in the image as the lower end of the lung field.

[Functions and Effects]

The present invention can also be applied to recognition of a lower end of a lung field. As for the lower end of the lung field, there is a problem that the positions of the lower end of the right lung and the lower end of the left lung do not necessarily coincide with each other. The aforementioned configuration is configured to recognize both the lower end of the right lung and the lower end of the left lung and recognize the lowest end of the lung field as the lower side of the image. With this, it is possible to trim the image without cutting the lower part of the left and right lungs.

Further, it is preferable to further include trimming means configured to generate a trimmed image from which an image of a lung field area is extracted from a radiation image based on a position of an end of the lung or the area specified by the lung field end identifying means.

Further, in the aforementioned image processing apparatus, it is more preferable to include lung field luminance adjustment means configured to adjust contrast for the trimmed image.

Effects of the Invention

In the present invention, visibility of a lung field can be assuredly improved by assuredly recognizing a position of the lung field reflected in a radiation image. That is, according to the present invention, a total value profile to be used for searching a lung field end is generated based on a radiation image. A pacemaker and/or an annotation reflected in a radiation image is merely reflected darkly in the image, and the existence is not particularly emphasized by edge enhancement. Therefore, the total value profile according to the present invention is not significantly affected by a pacemaker and/or an annotation. Therefore, according to the present invention, there occurs no false recognition regarding the end of the lung field due to a pacemaker and/or an annotation.

DESCRIPTION OF PREFERRED EMBODIMENTS

<Example 1>

Figure 1:
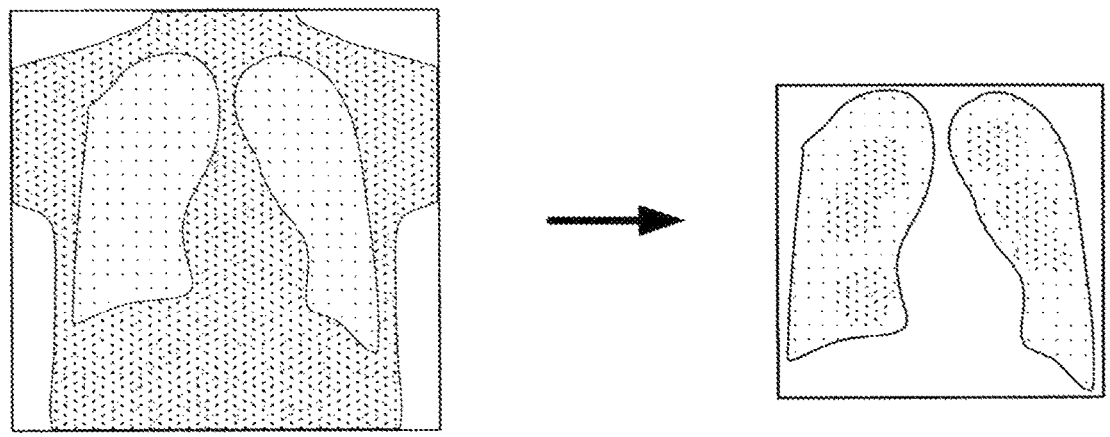
FIG. 1 is a schematic diagram illustrating image processing performed by an image processing apparatus according to a first embodiment.

Next, embodiments according to the present invention will be described. The image processing apparatus of the present invention is a device for applying luminance adjustment to the portion corresponding to the lung field in the radiation image in which the lung field of the subject is reflected. That is, as shown in FIG. 1, the image processing apparatus according to the present invention is configured such that when a chest X-ray image (original image P0) of a subject image-captured by the X-ray imaging apparatus is input, an image in which the contrast of the lung field of the subject is adjusted is output.

Figure 2:
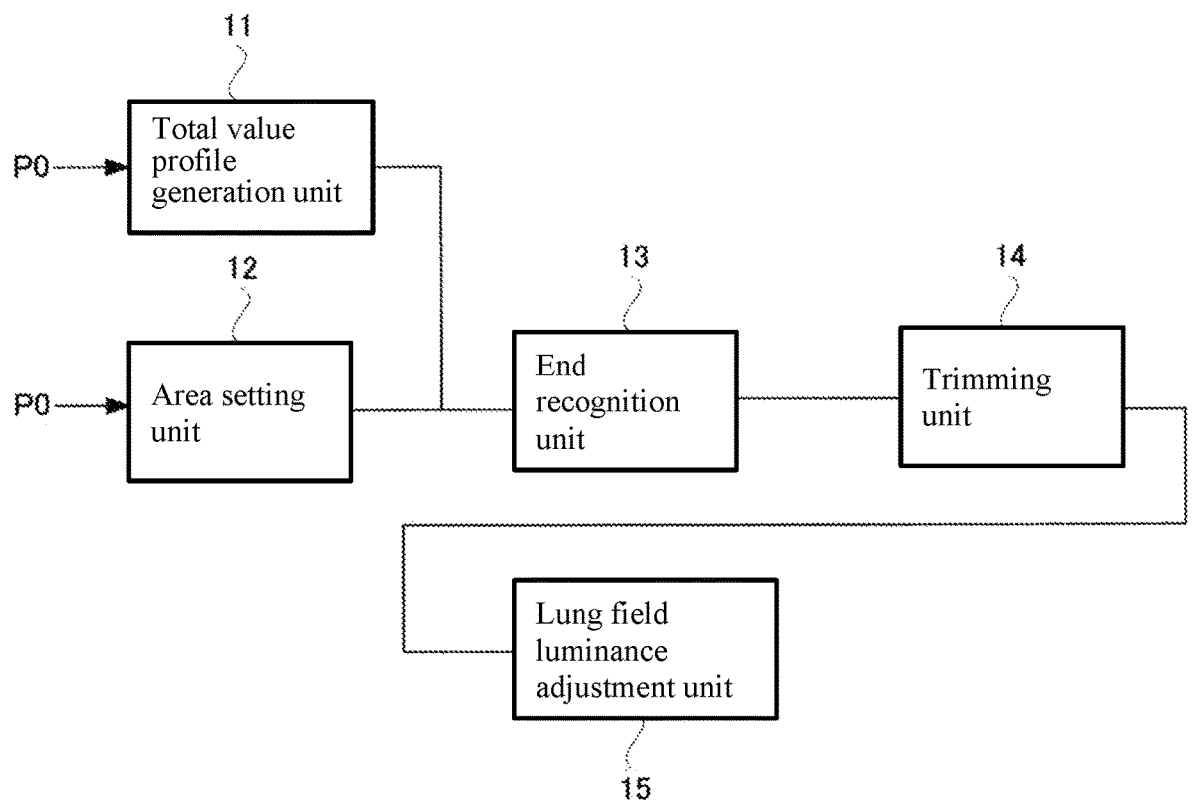
FIG. 2 is a functional block diagram illustrating an entire configuration of the image processing apparatus according to the first embodiment.

FIG. 2 is a functional block diagram showing the entire image processing performed by the image processing apparatus 1. According to FIG. 2, the rough position of the lung field on the original image P0 is specified by a total value profile generation unit 11, an area setting unit 12, and an end recognition unit 13, and a trimmed image in which the lung field is extracted from the original image P0 for each peripheral area by the trimming unit 14 is generated. The lung field luminance adjustment unit 15 adjusts the contrast of the trimmed image. As described above, the image processing apparatus according to the present invention is configured to perform the contrast adjustment only on the lung field of the original image P0. Note that the trimming unit 14 corresponds to the trimming means of the present invention, and the lung field luminance adjustment unit 15 corresponds to the lung field luminance adjustment means of the present invention.

In the image processing apparatus 1 of the present invention, recognition of a lung field is executed by the total value profile generation unit 11, the area setting unit 12, the end recognition unit 13, and the trimming unit 14.

That is, in a conventional configuration, lung field recognition is performed by applying edge enhancement processing to the original image, whereas the present invention is configured to execute lung field recognition by analyzing the total value profile. Each unit 11, 12, 13, and 14 cooperates to extract only the lung field as much as possible to generate a trimmed image. Hereinafter, each unit 11, 12, 13, and 14 will be described.

Figure 3:
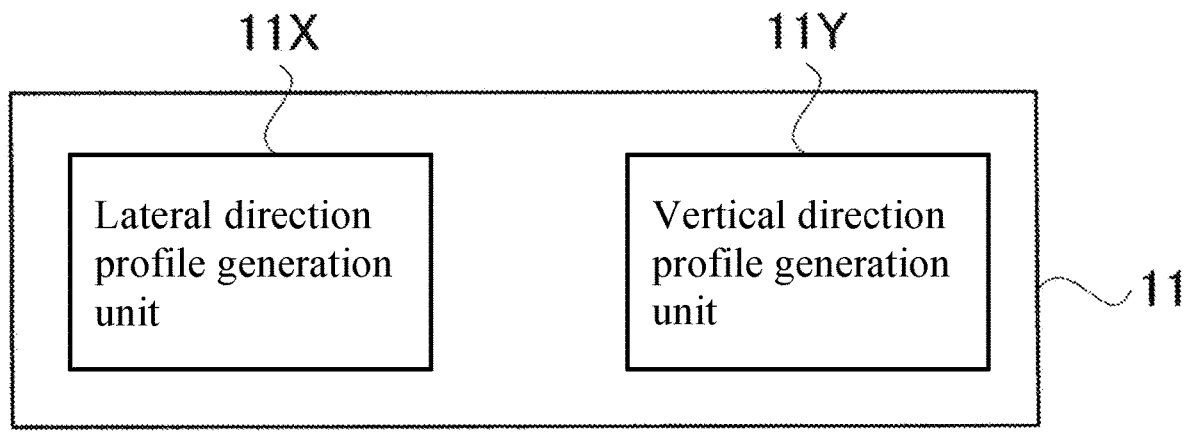
FIG. 3 is a functional block diagram illustrating a total value profile generation unit according to the first embodiment.

FIG. 3 more specifically shows the total value profile generation unit 11. The total value profile generation unit 11 is provided with a lateral direction profile generation unit 11X and a vertical direction profile generation unit 11Y. The total value profile PX generated by the lateral direction profile generation unit 11X is used to find the right and left ends of the lung field in the original image P0, and the total value profile PY generated by the vertical direction profile generation unit 11Y is used to find the upper and lower ends of the lung field in the original image P0. The total value profile generation unit 11 generates a total value profile PX, PY based on the original image P0. The explanation of the total value profile will be made later. Note that the lateral direction profile generation unit 11X corresponds to the lateral direction profile generation means of the present invention and that the vertical direction profile generation unit 11Y corresponds to the vertical direction profile generation means of the present invention.

The end recognition unit 13 is configured to recognize the four ends of the right end, the left end, the upper end, and the lower end of the lung field appearing in the original image P0. Therefore, it also can be considered that the end recognition unit 13 is composed of four units, i.e., a lung field right end recognition unit which recognizes the right end of the lung field, a lung field left end recognition unit which recognizes the left end of the lung field, a lung field upper end recognition unit which recognizes the upper end of the lung field, and a lung field lower end recognition unit which recognizes the lower end of the lung field. Based on this idea, FIG. 4 to FIG. 7 show examples in which the end recognition unit 13 is shown as a functional block diagram for each of the four units of the lung field right end recognition unit 13R, the lung field left end recognition unit 13L, the lung field upper end recognition unit 13T, and the lung field lower end recognition unit 13U. These functional block diagrams show the functional block diagram of FIG. 2 in more detail. However, in FIG. 4 to FIG. 7, the trimming unit 14 and the lung field luminance adjustment unit 15 shown in FIG. 2 are omitted. Note that the lung field right end recognition unit 13R corresponds to the lung field right end recognition means of the present invention and the lung field left end recognition unit 13L corresponds to the lung field left end recognition means of the present invention. Also note that the lung field upper end recognition unit 13T corresponds to the lung field upper end recognition means of the present invention and the lung field lower end recognition unit 13U corresponds to the lung field lower end recognition means of the present invention.

Figure 4:
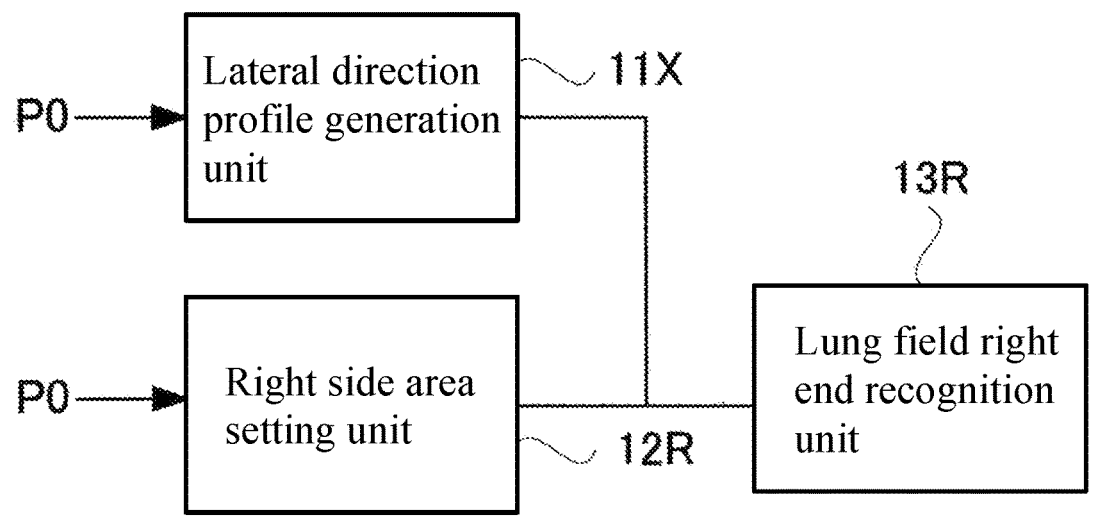
FIG. 4 is a functional block diagram illustrating a configuration according to a lung field right end recognition of Example 1.

FIG. 4 shows a lung field right end recognition unit 13R that recognizes the right end of the lung field in the original image P0. The lung field right end recognition unit 13R receives the total value profile PX from the lateral direction profile generation unit 11X and receives data indicating the search range from the right side area setting unit 12R. The lung field right end recognition unit 13R recognizes the position of the right end of the lung field from the search range on the total value profile PX. The right side area setting unit 12R corresponds to the right side area setting means of the present invention.

Figure 5:
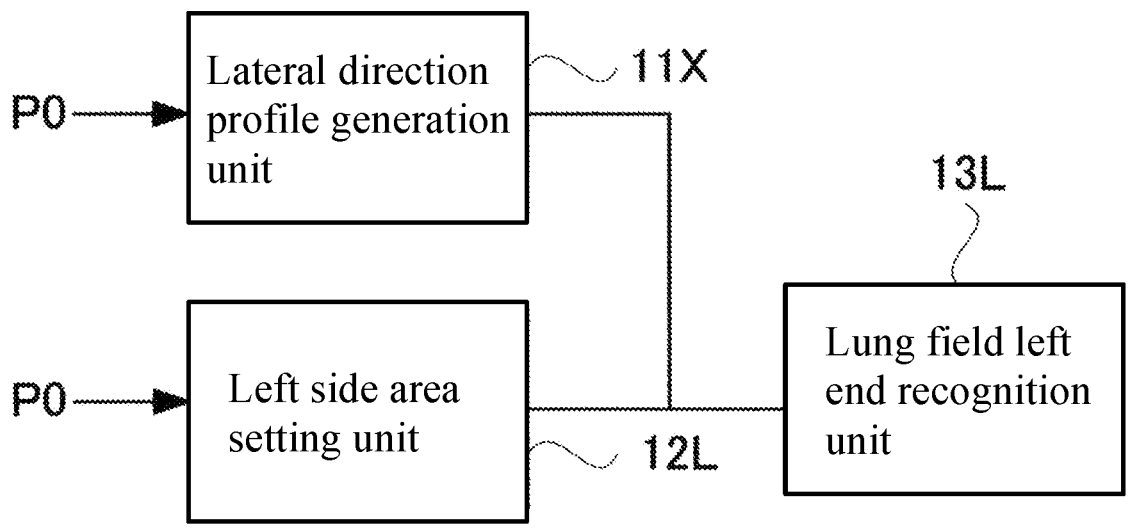
FIG. 5 is a functional block diagram illustrating a configuration according to a lung field left end recognition of Example 1.

FIG. 5 shows a lung field left end recognition unit 13L that recognizes the left end of the lung field in the original image P0. The lung field left end recognition unit 13L receives the total value profile PX from the lateral direction profile generation unit 11X and receives data indicating the search range from the left side area setting unit 12L. The lung field left end recognition unit 13L recognizes the position of the left end of the lung field from the search range on the total value profile PX. The left side area setting unit 12L corresponds to the left side area setting means of the present invention.

Figure 6:
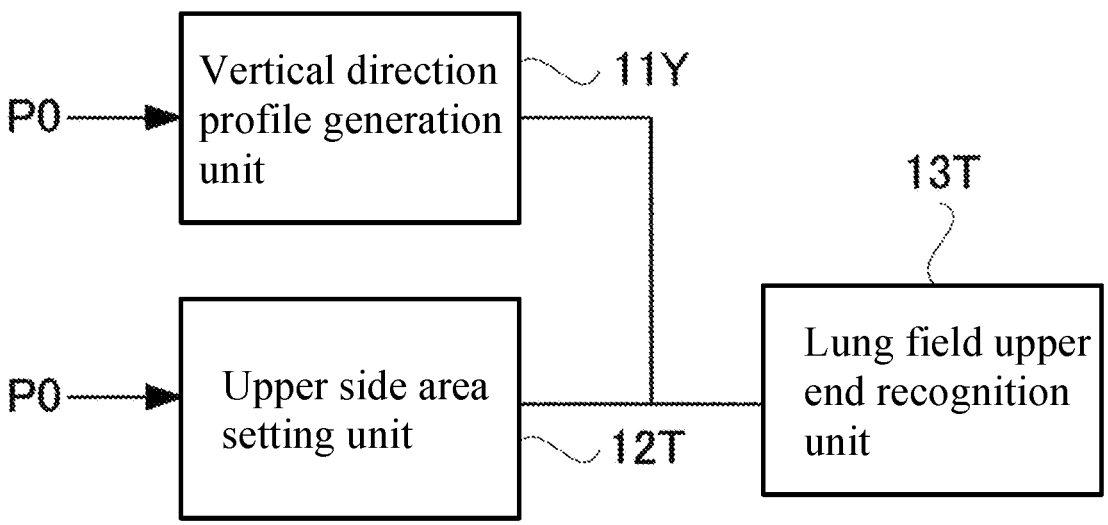
FIG. 6 is a functional block diagram illustrating a configuration according to a lung field upper end recognition of Example 1.

FIG. 6 shows the lung field upper end recognition unit 13T that recognizes the upper end of the lung field in the original image P0. The lung field upper end recognition unit 13T receives the total value profile PY from the vertical direction profile generation unit 11Y and receives data indicating the search range from the upper side area setting unit 12T. The lung field upper end recognition unit 13T recognizes the position of the upper end of the lung field from the search range on the total value profile PY. The upper side area setting unit 12T corresponds to the upper side area setting means of the present invention.

Figure 7:
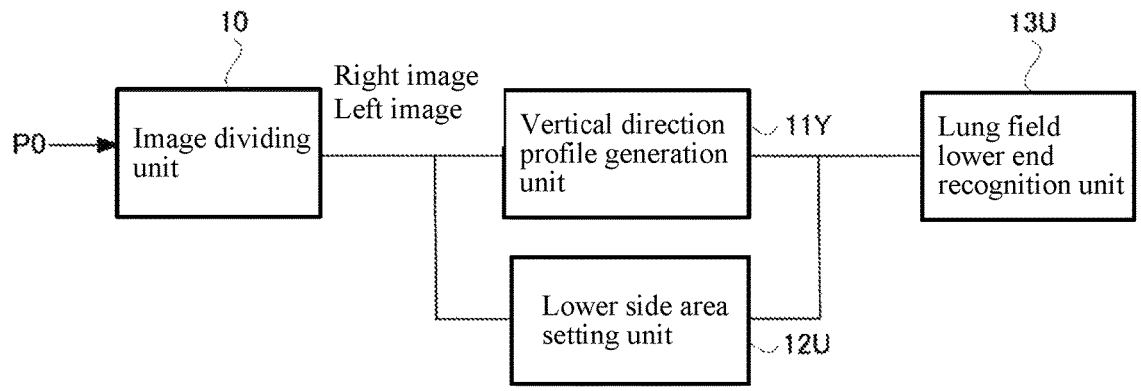
FIG. 7 is a functional block diagram illustrating a configuration according to a lung field lower end recognition of Example 1.

FIG. 7 shows a lung field lower end recognition unit 13U that recognizes the lower end of the lung field in the original image P0. Recognition of the lower end of the lung field is realized by more complex processing than the aforementioned lung field right end recognition unit 13R, lung field left end recognition unit 13L, and lung field upper end recognition unit 13T. First, in the original image P0, the original image P0 is divided into left and right by the image dividing unit 10, and two images are generated. Based on the generated right image and left image, two vertical direction profiles are generated. The lung field upper end recognition unit 13T receives two of total value profiles PY from the vertical direction profile generation unit 11Y and receives data indicating the search range from the lower side area setting unit 12U for each total value profile. Then, the lung field lower end recognition unit 13U executes recognition of the position of the lower end of the lung field for the two profiles from the search range on the total value profile PY. As a result, the position of the lower end of the lung field is recognized as two for the right image and the left image. The lung field lower end recognition unit 13U selects one of the recognized two positions and recognizes the position of the lower end of the lung field in the original image P0. The lower side area setting unit 12U corresponds to the lower side area setting means of the present invention.

Note that the right side area setting unit 12R, the left side area setting unit 12L, the upper side area setting unit 12T, and the lower side area setting unit 12U in FIG. 4 to FIG. 7 are represented by separating the area setting unit 12 in FIG. 2 into four in accordance with respective units 13R, 13L, 13T, and 13U. Note that the image dividing unit 10 in FIG. 7 is omitted in FIG. 2.

<Recognition of Right End of Lung Field>

Hereinafter, the operation when recognizing the right end of the lung field from the original image P0 will be described.

Figure 8:
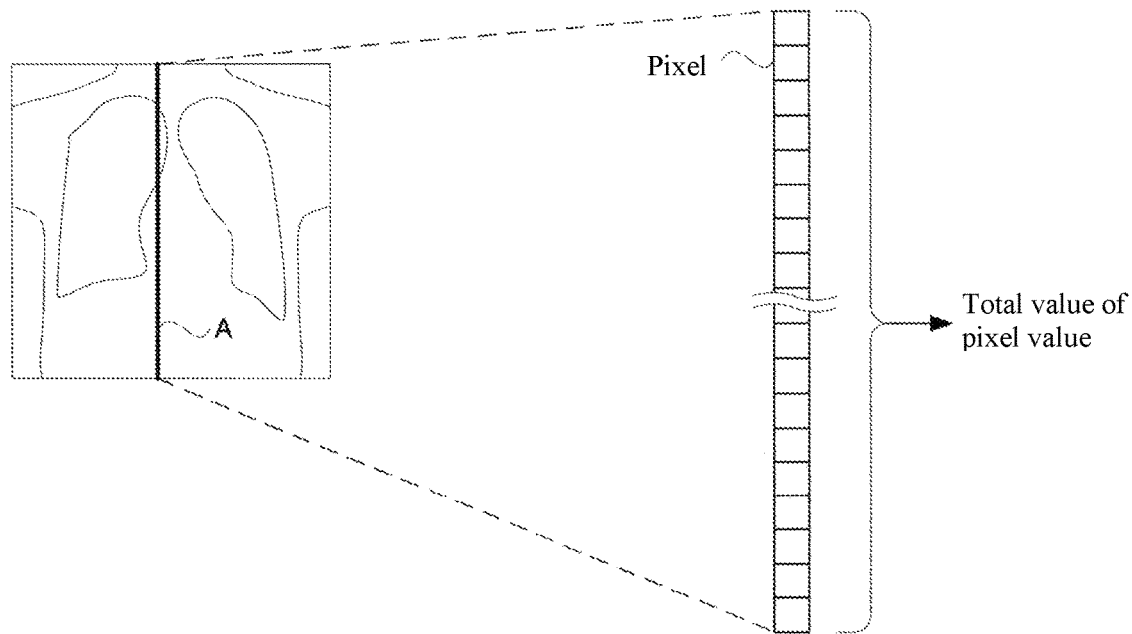
FIG. 8 is a schematic diagram illustrating a lateral direction profile according to Example 1.

In recognizing a right end of a lung field, a total value profile PX is required. FIG. 8 illustrates a total value profile PX generated by the lateral direction profile generation unit 11X based on an original image P0. The original image P0 is configured by arranging pixels vertically and horizontally. Let's consider a pixel column A in which pixels are arranged in a vertical column on the original image P0. A pixel value is allocated to the pixel constituting this pixel column A. The value obtained by adding the pixel values of all pixels constituting this pixel column A will be referred to as a total value. The total value calculated at this time corresponds to the pixel column A.

Figure 9:
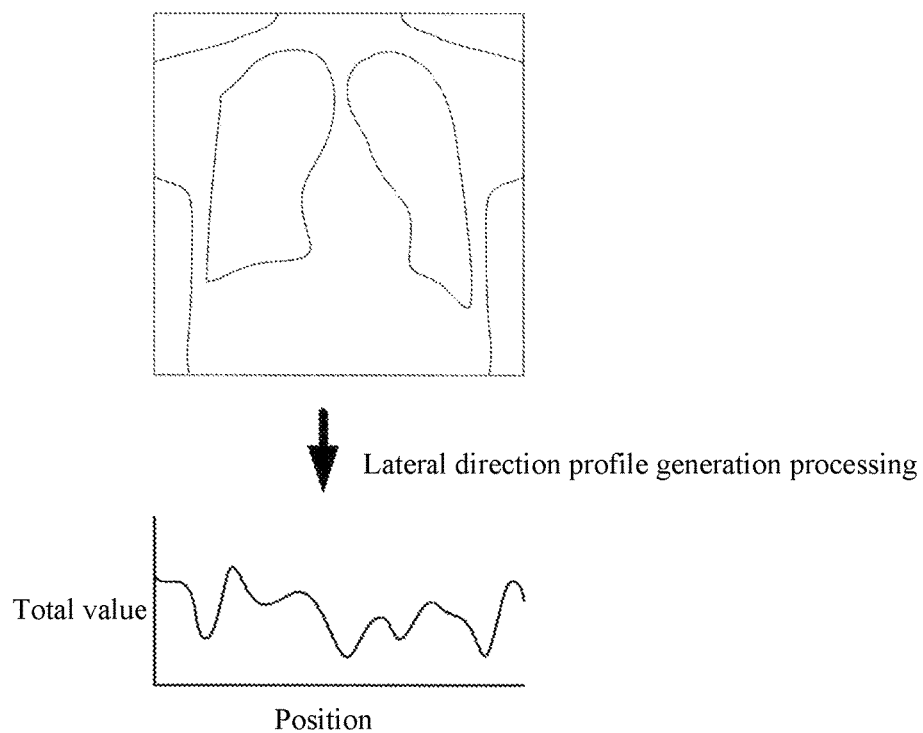
FIG. 9 is a schematic diagram illustrating a lateral direction profile according to Example 1.

In the original image P0, since pixels are arranged vertically and horizontally, it can be considered that in the original image P0, pixel columns like the pixel column A in FIG. 8 are arranged in the horizontal direction. The lateral direction profile generation unit 11X calculates the total value for these pixel columns and generates a profile in which the position of the pixel column and the total value are related as shown in FIG. 9. This profile is a total value profile PX. As described above, the lateral direction profile generation unit 11X recognizes that the original image P0 is generated by arranging pixel columns in which pixels are arranged in the lateral direction with the width of one pixel, calculate the total value by adding pixel values of pixels belonging to a pixel column extending in the vertical direction for each pixel column, and generates a total value profile PX which is a profile extending in the lateral direction associated with the position of pixel column and the total value.

The total value profile PX is sent to the lung field right end recognition unit 13R. The lung field right end recognition unit 13R searches for the portion corresponding to the right end of the lung field from the total value profile PX. However, since the total value profile PX is a profile for the entire original image P0, it also includes an area not necessary for searching the right end of the lung field.

Figure 10:
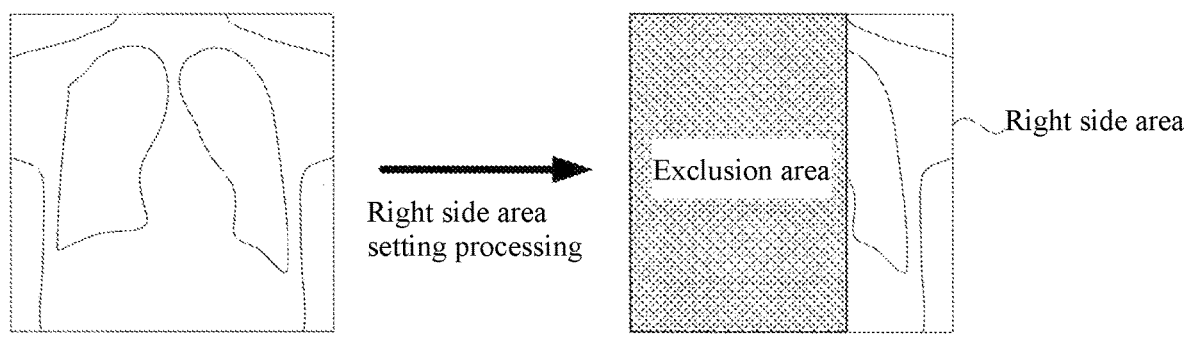
FIG. 10 is a schematic diagram illustrating an operation according to the lung field right end recognition of Example 1.

Therefore, in the present invention, as shown in FIG. 10, the right side area setting unit 12R is configured to predict the rough position of the right end of the lung field and set an area including the right end of the lung field in the original image P0. The area including this right end will be referred to as a right side area. The right side, the upper side, and the lower side of the right side area coincide with the right side, the upper side, and the lower side of the original image P0, respectively, and the left side of the right side area is set to the position (position crossing) passing through the right lung reflected in the original image P0. Therefore, the right lung reflected in the right side area lacks the upper side. In the original image P0, the area other than the right side area is referred to as an exclusion area and belongs particularly a spinal column of a subject. Therefore, the right side area does not include a spinal column. The position on the image of the right side area may be preset before acquiring the original image P0. The right side area setting unit 12R sets the right side area including the right end, which is the end of the lung field positioned at the right end of the image. The right side area setting unit 12R sets the area by avoiding vertebras of a subject reflected as a vertically long line near the center of the image.

Figure 11:
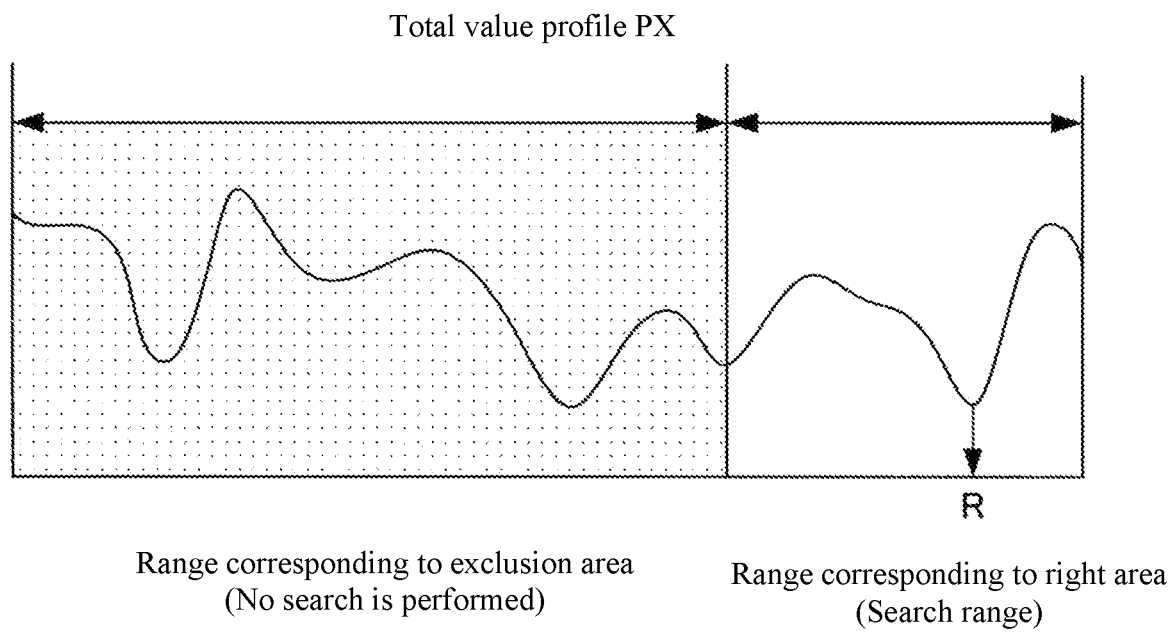
FIG. 11 is a schematic diagram illustrating the operation according to the lung field right end recognition of Example 1.

The data indicating the position of the right side area is sent to the lung field right end recognition unit 13R. As shown in FIG. 11, the lung field right end recognition unit 13R recognizes the range on the total value profile PX corresponding to the right side area as a search range which is a range for searching the right end of the lung field and does not perform a search on the range of the total value profile PX corresponding to the exclusion area described in FIG. 10.

As shown in FIG. 11, the lung field right end recognition unit 13R searches a position R where the total value is the lowest in the search range on the total value profile PX corresponding to the right side area, and recognizes the position R in the lung field right end.

Figure 12:
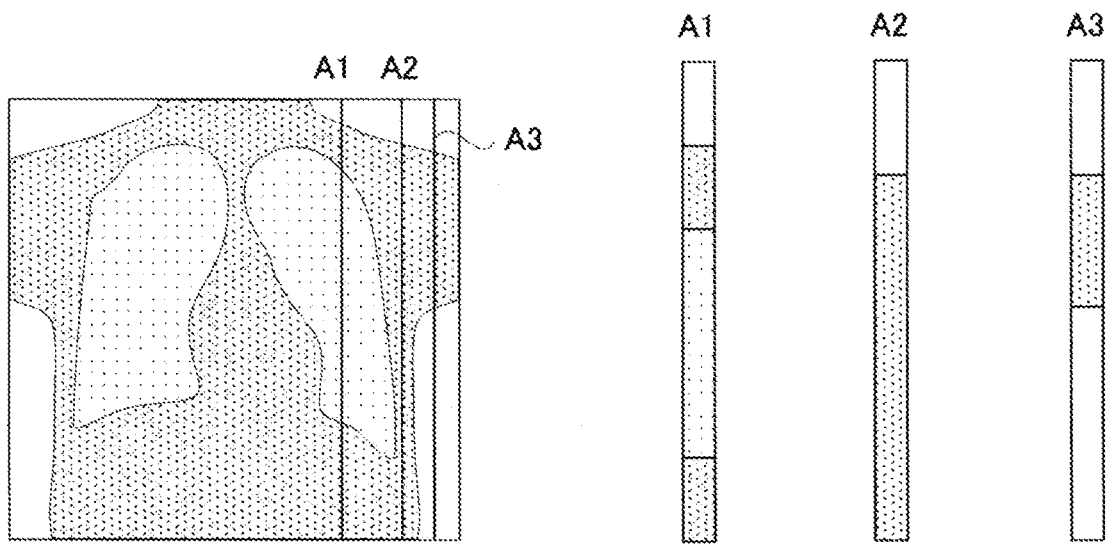
FIG. 12 is a schematic diagram illustrating the operation according to the lung field right end recognition of Example 1.

This position R certainly indicates the right end of the lung field in the original image P0. This reason will be explained. FIG. 12 illustrates three pixel columns positioned in the right side area described in FIG. 10. Among them, the pixel columns A1 and A2 are pixel columns belonging to a trunk part of a subject as shown in the left side of FIG. 12, the pixel column A1 passes through the lung field, and the pixel column A2 is positioned outside the lung field. The pixel column A3 is positioned outside the trunk part of the subject.

Next, configurations of the pixel columns A1 and A2 will be considered. In the upper part of the pixel columns A1, A2, an area where air is reflected is positioned, and below the area, an area where a subject is reflected is positioned. Since both the pixel columns are positioned in the trunk of the subject, an area in which the subject is reflected occupies the majority of the pixel column. In this regard, the pixel column A3 is not positioned in the trunk part, so the area in which the air is reflected is the majority of the pixel column.

The total value of the pixel column A1 is higher than the total value of the pixel column A2. This is because that the pixel column A1 contains a bright lung field in the area in which the subject is reflected, but in the pixel column A2, there exists no bright lung field and dark portions (subject's muscle, skin, bone, etc.) are reflected. Further, the total value of the pixel column A3 is higher than the total value of the pixel column A2. This is because the pixel column A3 contains large areas in which bright air is reflected, but in the pixel column A2, such area only slightly exists on the top. That is, the position where the total value on the total value profile PX is the lowest represents a position of a pixel column in which the subject trunk part is reflected over the entire array like the pixel column A2 in FIG. 12 and shows the position of the pixel column in which no lung field is included. This position is very close to the lung field although it is located outside the lung field. Such circumstances are convenient when trying to trim the entire lung field. The lung field right end recognition unit 13R recognizes the right end of the lung field based on the aforementioned principle.

However, the position where the total value on the total value profile PX is the lowest does not necessarily represent the right end of the lung field. This is because in the position corresponding to vertebras of the subject on the total value profile PX, the total value also becomes lower and a portion where a total value is low exists also at the left end of the lung field of the subject.

In this respect, according to the present invention, it is configured to exclude the range corresponding to vertebras of the subject and the left end of the lung field of the specimen from the total value profile PX and search a position where the total value is the lowest. Therefore, the lung field right end recognition unit 13R does not inadvertently recognize vertebras and the left end of the lung field of the subject as the right end of the lung field. Such a configuration is realized by the right side area setting unit 12R which sets an area by avoiding vertebras of a subject reflected as a vertically long line near the center of the image.

<Recognition of Lung Field Left End>

Recognition of the left end of the lung field is similar to the recognition of the right end described above. That is, the lung field left end recognition unit 13L searches for the portion corresponding to the left end of the lung field from the total value profile PX. However, since the total value profile PX is a profile for the entire original image P0, it also includes an area not necessary for searching the left end of the lung field.

Figure 13:
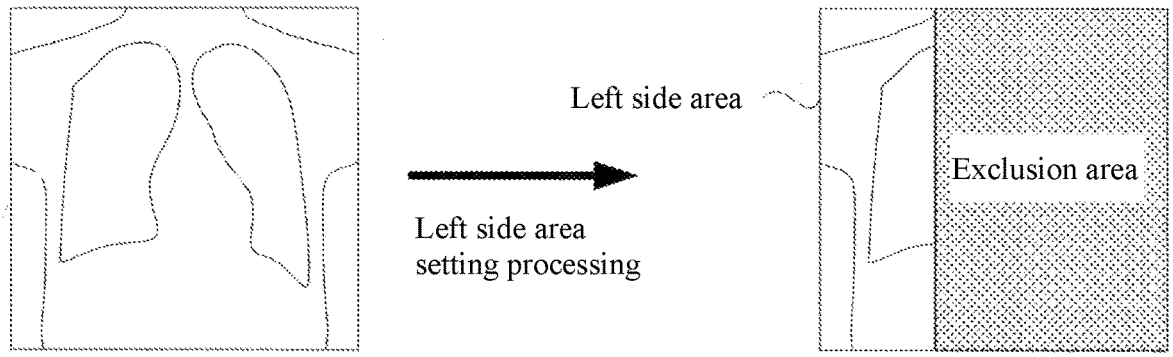
FIG. 13 is a schematic diagram illustrating the operation according to the lung field left end recognition of Example 1.

Therefore, in the present invention, as shown in FIG. 13, the left side area setting unit 12L is configured to predict the rough position of the left end of the lung field and set an area including the left end of the lung field in the original image P0. The area including this left end will be referred to as a left side area. The left side, the upper side, and the lower side of the left side area coincide with the left side, the upper side, and the lower side of the original image P0, respectively, and the left side of the left side area is set to the position (position crossing) passing through the left lung reflected in the original image P0. Therefore, the left lung reflected in the left side area lacks the right side. In the original image P0, the area other than the left side area is referred to as an exclusion area and belongs particularly a spinal column of a subject. Therefore, the left side area does not include a spinal column. The position on the image of the left side area may be preset before acquiring the original image P0. The left side area setting unit 12L sets the left side area including the left end, which is the end of the lung field positioned at the left end of the image. The left side area setting unit 12L sets the area by avoiding vertebras of a subject reflected as a vertically long line near the center of the image.

Figure 14:
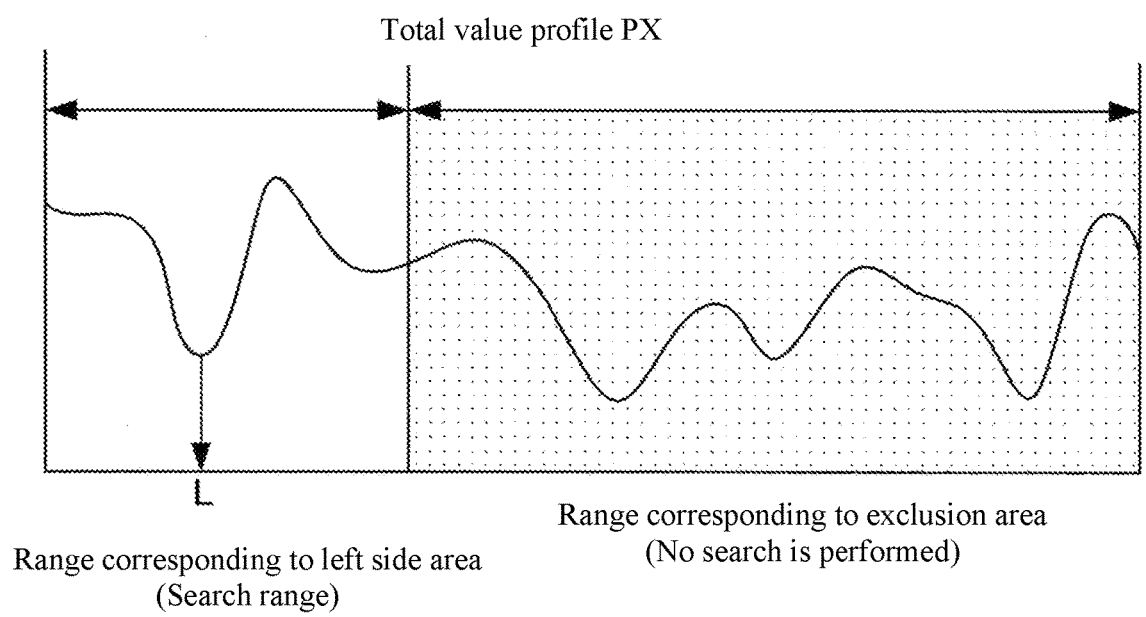
FIG. 14 is a schematic diagram illustrating the operation according to the lung field left end recognition of Example 1.

The data indicating the position of the left side area is sent to the lung field left end recognition unit 13L. As shown in FIG. 14, the lung field left end recognition unit 13L recognizes the range on the total value profile PX corresponding to the left side area as a search range which is a range for searching the left end of the lung field as shown in FIG. 14 and does not perform a search on the range of the total value profile PX corresponding to the exclusion area as shown in FIG. 13.

As shown in FIG. 14, the lung field left end recognition unit 13L searches for a position L where the total value is the lowest in the search range on the total value profile PX corresponding to the left side area, and recognizes the position L in the lung field left end.

The lung field left end recognition unit 13L is configured to exclude the range corresponding to vertebras of the subject and the right end of the lung field of the specimen from the total value profile PX and search a position where the total value is the lowest. With this configuration, the lung field left end recognition unit 13L does not inadvertently recognize vertebras and the right end of the lung field of the subject as the left end of the lung field.

Figure 15:
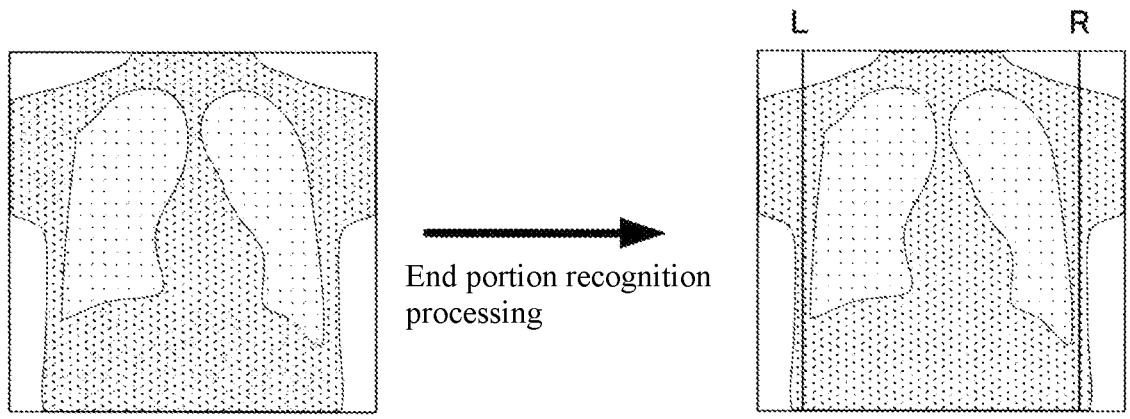
FIG. 15 is a schematic diagram illustrating an intermediate stage of an operation related to the lung field recognition of Example 1.

FIG. 15 collectively illustrates recognitions of lung field end portions which have been made so far. With the lung field right end recognition unit 13R and the lung field left end recognition unit 13L, the ends of the lung field in the original image P0 were recognized in the lateral direction.

<Recognition of Upper End of Lung Field>

Subsequently, recognition of the upper end of the lung field in the present invention will be described. For recognition of the upper end of the lung field, a new total value profile is required. That is, instead of the total value profile PX extending in the lateral direction of the image used for recognizing left and right ends of the lung field, a total value profile PY extending in the vertical direction of the image is required. This is because when trying to find the upper and lower ends of the lung field, it is necessary not to perform the processing in the horizontal direction of the image described in FIG. 8 to FIG. 15, but to perform the processing in the vertical direction rotated by 90 degrees.

Figure 16:
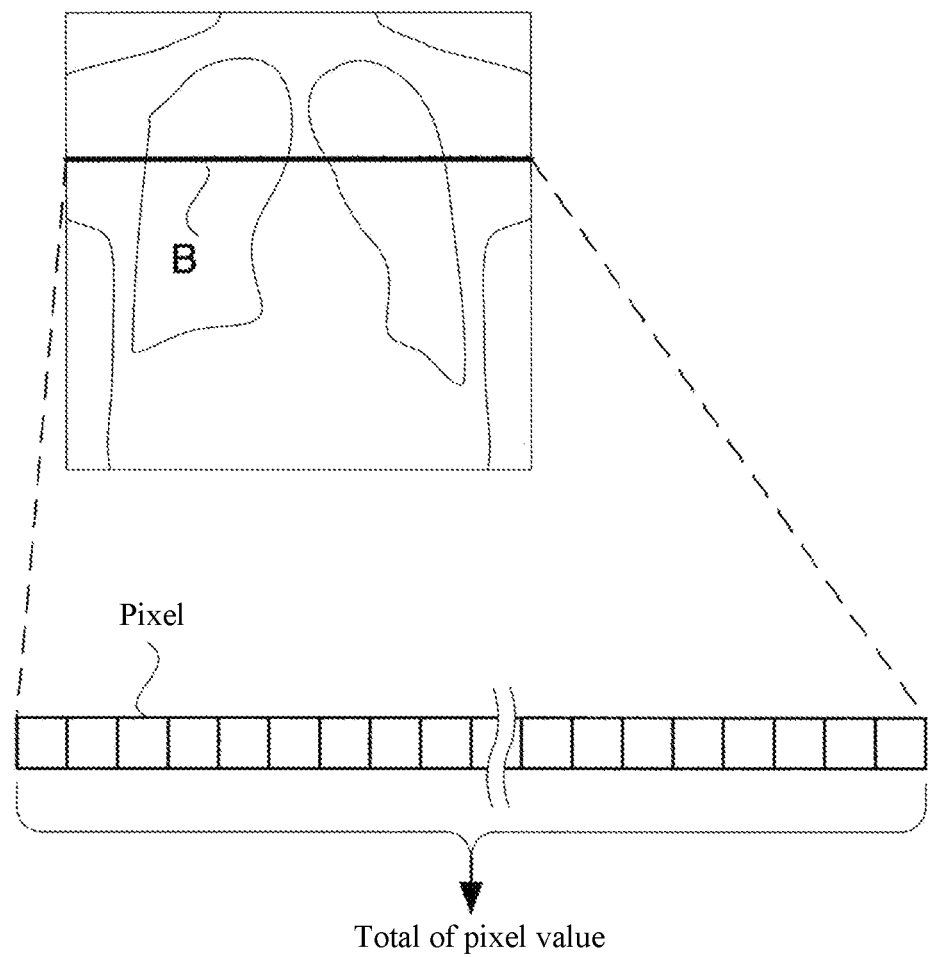
FIG. 16 is a schematic diagram illustrating a vertical direction profile according to Example 1.

FIG. 16 illustrates a total value profile PY generated by the vertical direction profile generation unit 11Y based on an original image P0. The original image P0 is configured by arranging pixels vertically and horizontally. Let us consider a pixel column B in which pixels are arranged vertically in a column on the original image P0. A pixel value is allocated to the pixel constituting this pixel column A. The value obtained by adding the pixel values of all pixels constituting this pixel column B will be referred to as a total value. The total value calculated at this time corresponds to the pixel column B.

Figure 17:
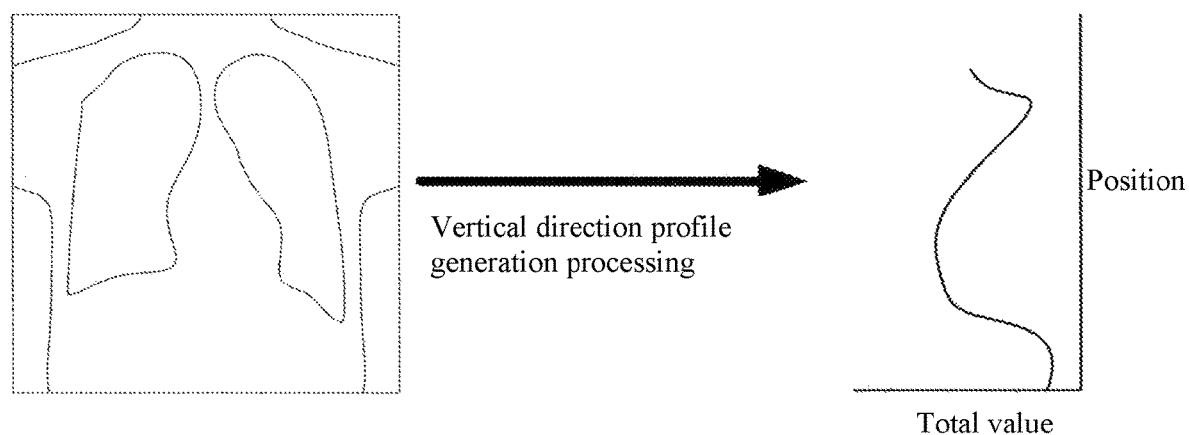
FIG. 17 is a schematic diagram illustrating a vertical direction profile according to Example 1.

In the original image P0, since pixels are arranged vertically and horizontally, it can be considered that in the original image P0, pixel columns like the pixel column B in FIG. 16 are arranged side-by-side in the vertical direction. The vertical direction profile generation unit 11Y calculates the total value of these pixel columns and generate a profile in which the position of the pixel column and the total value are related as shown in FIG. 17. This profile is a total value profile PY. The vertical direction profile generation unit 11Y recognizes that the image is generated by arranging pixel columns in which pixels are arranged in the lateral direction with the width of one pixel in the vertical direction, calculate the total value by adding pixel values of pixels belonging to a pixel column extending in the lateral direction for each pixel column, and generates a vertical direction profile which is a profile extending in the vertical direction associated with the position of pixel column and the total value.

The total value profile PY is sent to the lung field upper end recognition unit 13T. The lung field upper end recognition unit 13T searches for the portion corresponding to the upper end of the lung field from the total value profile PY. However, since the total value profile PY is a profile for the entire original image P0, it also includes an area not necessary for searching the upper end of the lung field. Therefore, in the present invention, the upper side area setting unit 12T is configured to predict the rough position of the upper end (the end of the lung field positioned on the upper end side of the image) of the lung field and set an area including the upper end of the lung field in the original image P0. In this way, the recognition on the upper side of the lung field is configured to set a part of the total value profile as a search area in the same manner as in the recognition of the right end of the lung field and the left end of the lung field.

When searching the right end of the lung field, the area including the right end of the lung field is set as the right side area as shown in FIG. 10. The lung field right end recognition unit 13R searches for the right end of the lung field from within this area. Actually, as for the upper end of the lung field, a similar operation is performed. That is, the upper side area setting unit 12T sets the area including the upper end of the lung field in the original image P0 to the upper side area, and the lung field upper end recognition unit 13T searches in this upper side area to recognize the upper end position of the lung field.

By the way, the right side area shown in FIG. 10 related to the right end search of the lung field right is an area including the right end of the original image P0. In this example, it seems to be sufficient also to set the upper side area related to the upper end search of the lung field as an area including the upper edge of the original image P0.

Figure 18:
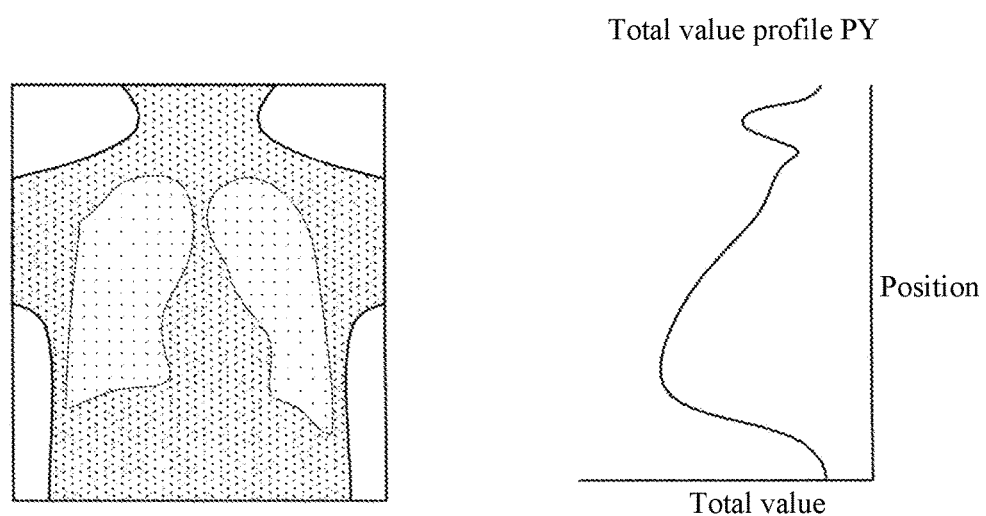
FIG. 18 is a schematic diagram illustrating problems occurring during lung field upper end recognition according to Example 1.

However, the searching the upper end of the lung field has a special circumstance different from that for the right end of the lung field. FIG. 18 explains this situation. Although omitted in the original image P0 illustrated so far, the jaw of the subject image may sometimes appear in the original image P0 as shown in the left side of FIG. 18. In the jaw on the image, since the bony parts of the subject are overlapped and reflected, in the image, considerably dark pixels are concentrated. For this reason, the total value in the part on the total value profile PY corresponding to the position of the jaw of the subject is considerably low. When trying to find the upper end of the lung field from the original image P0, the place where the total value is the lowest in the search range defined by the total value profile PY as explained in FIG. 11 is found. At that time, unless the part where the jaw of the subject is included is excluded from the search range, there is a possibility that the jaw is falsely recognized as the upper end of the lung field.

Figure 19:
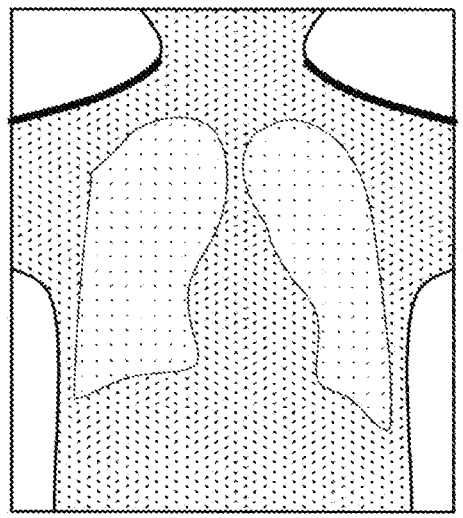
FIG. 19 is a schematic diagram illustrating an operation of lung field upper end recognition according to Example 1.

Therefore, the upper side area setting unit 12T is configured to recognize the area except for the jaw of the subject as the upper side area, and the lung field upper end recognition unit 13T is configured to search the upper end of the lung field within the upper side area. Specifically, the upper side area setting unit 12T analyzes the original image P0 to recognize the position of the outline of the shoulder of the subject indicated by the thick line shown in FIG. 19, and then does not allow the lung field upper end recognition unit 13T to search the upper portion than the position of the outline.

Figure 20:
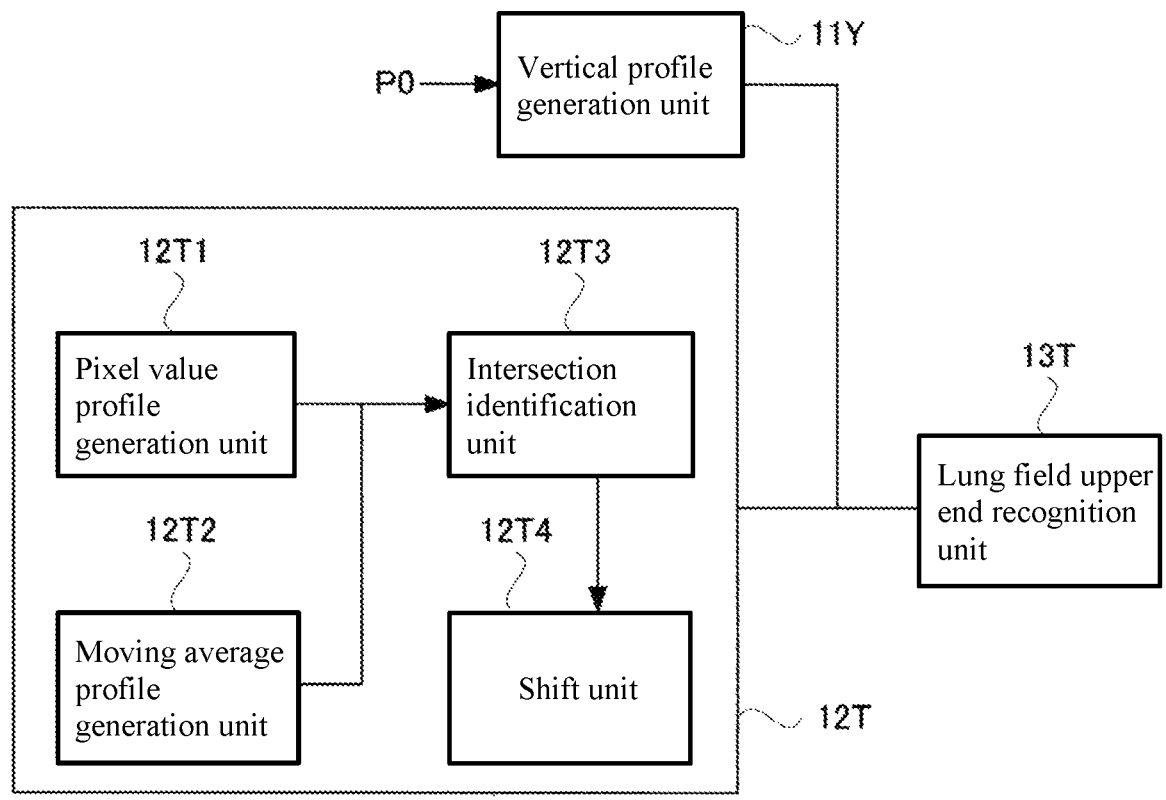
FIG. 20 is a functional block diagram illustrating a configuration according to a lung field upper end recognition of Example 1.

FIG. 20 is a rewritten functional block diagram of the functional block diagram described in FIG. 6, and the upper side area setting unit 12T is shown in more detail. The upper side area setting unit 12T is equipped with a pixel value profile generation unit 12T1, a moving average profile generation unit 12T2, an intersection identification unit 12T3, and a shift unit 12T4.

Figure 21:
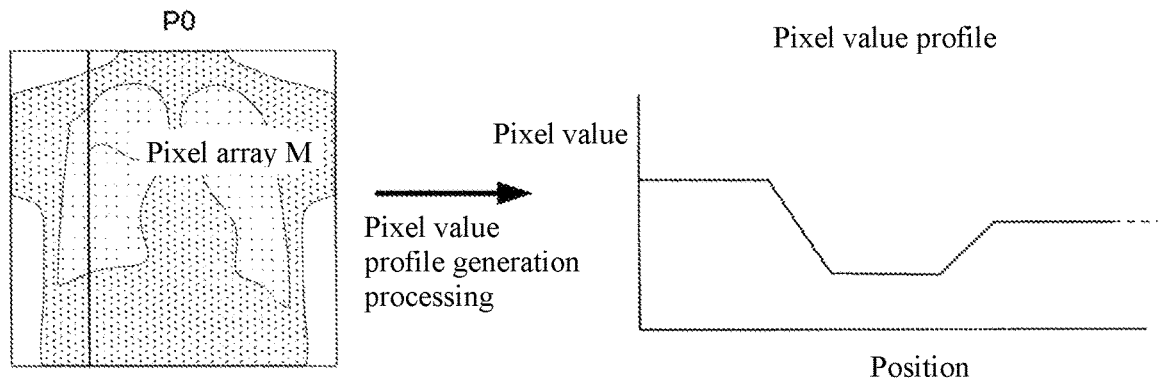
FIG. 21 is a schematic diagram illustrating an operation of an upper side area setting unit according to Example 1.

FIG. 21 shows the operation of the pixel value profile generation unit 12T1. The pixel value profile generation unit 12T1 sets a pixel column M in which pixels are arrayed in a row in the vertical direction in the original image P0. This pixel column M extends in the vertical direction, the upper end is the part where the air is reflected in the original image P0, the central part is the part where the lung field is reflected. The portion between these two parts is a part where the shoulder of the subject is reflected. Pixels belonging to each portion are different in brightness. In general, the portion where the air is reflected is the brightest portion, and the portion where the lung field is reflected is the next brightest portion. The portion where the shoulder is reflected is the darkest portion.

The pixel value profile generation unit 12T1 generates a profile in which the pixel value of each pixel belonging to the pixel column M and the position of each pixel are associated each other. This profile is referred to as a "pixel value profile". This pixel value profile is different from the aforementioned total value profile. A total value profile the original image P0 provides plural totals of pixel values of corresponding plural columns, but a pixel value profile is a profile corresponding to one pixel column (e.g., column M). Therefore, when considering a plurality of pixel columns in the original image P0, there exists the same number of pixel value profiles as the pixel columns.

Figure 22:
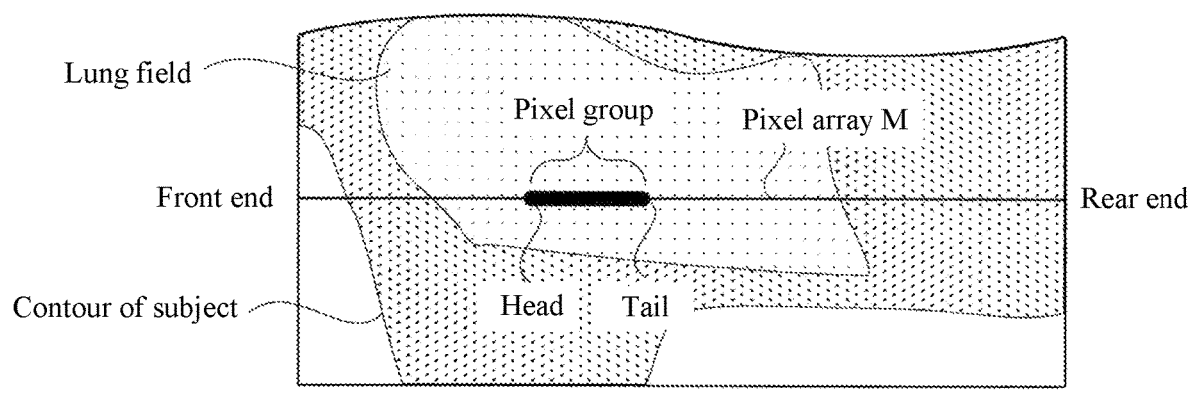
FIG. 22 is a schematic diagram illustrating an operation of an upper side area setting unit according to Example 1.

FIG. 22 illustrates the operation of the moving average profile generation unit 12T2. The moving average profile generation unit 12T2 generates a new profile different from the pixel value profile for the pixel column M designated by the pixel value profile generation unit 12T1. That is, the moving average profile generation unit 12T2 sets a pixel group on the pixel array M and generates a profile in which an average value of pixel values of pixels belonging to this pixel group and the position of the pixel group are associated. This profile will be referred to as a "moving average profile". The pixel group is constituted by a predetermined number of pixels belonging to the pixel column M and arranged consecutively. This moving average profile is different from the aforementioned total value profile. A total value profile for the original image P0 provides plural totals of pixel values of corresponding plural columns, but a moving average profile is a profile corresponding to one pixel column (e.g., column M). Therefore, when considering a plurality of pixel columns in the original image P0, there exists the same number of moving average profiles as the pixel columns.

The shoulder side end in the pixel column M is defined as a front end, and the waist side end in the pixel column M is defined as a rear end. The boundary (contour of the subject) between the subject image P0 and the air area in the original image P0 is positioned on the front end side of the pixel column M. The pixel group has a head facing the front end side of the pixel column M and a tail facing the rear end side of the pixel column M.

Figure 23:
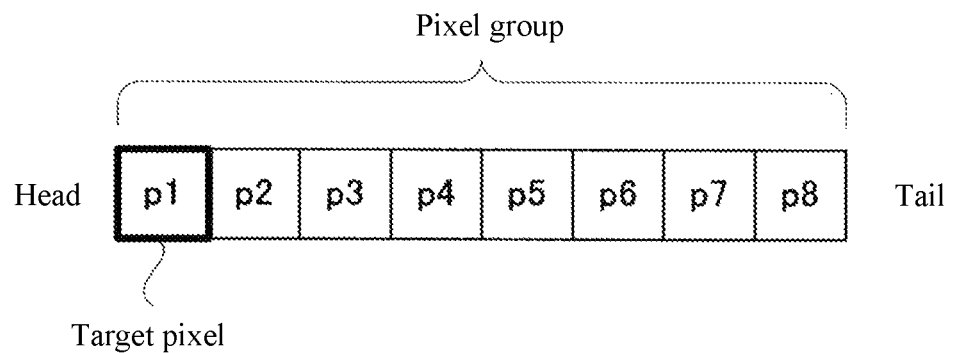
FIG. 23 is a schematic diagram illustrating an operation of an upper side area setting unit according to Example 1.

FIG. 23 illustrates the details of the structure of the pixel group. In the example shown in FIG. 23, the pixel group is composed of eight pixel p1 to pixel p8 arranged in series. The pixel p1 located at the head of this pixel group is a pixel referred to as a target pixel and is a pixel representing the position of the pixel group on the original image P0. The pixel group is treated as existing at the position of the target pixel on the original image P0.

Figure 24:
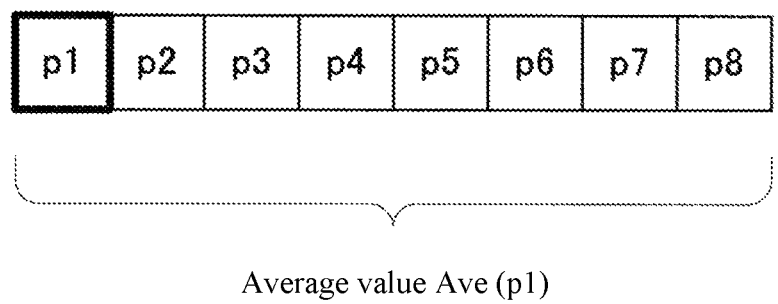
FIG. 24 is a schematic diagram illustrating an operation of an upper side area setting unit according to Example 1.

FIG. 24 illustrates how the moving average profile generation unit 12T2 calculates the average value of the pixel group. The moving average profile generation unit 12T2 calculates the average value Ave by averaging the pixel values of the eight pixel p1 to pixel p8 constituting the pixel group. The average value Ave indicates the average value of the pixels in the pixel group, but since the position of the pixel group is defined based on the target pixel, the average value Ave can be considered to be a value related to the target pixel p1. Therefore, this average value can be expressed as a function Ave (p1).

Figure 25:
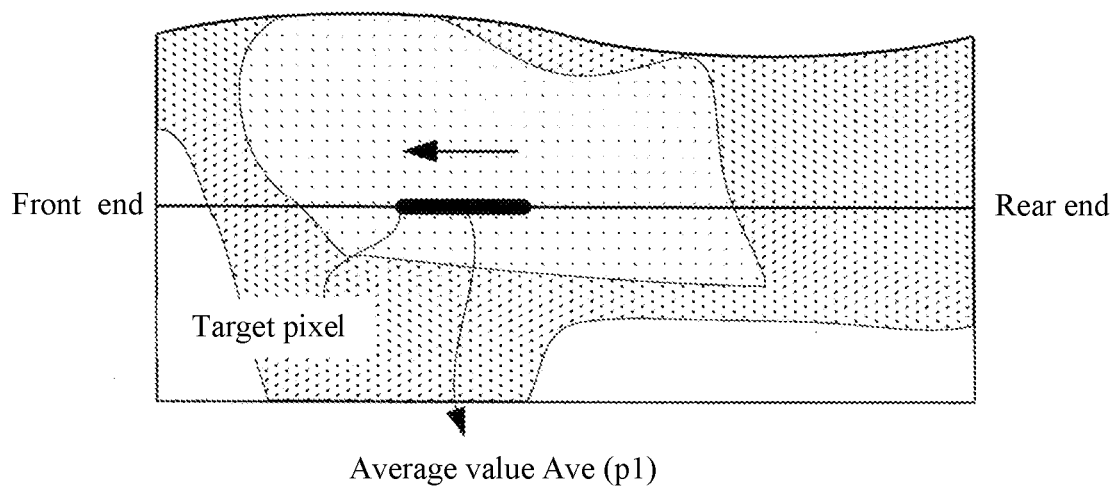
FIG. 25 is a schematic diagram illustrating an operation of an upper side area setting unit according to Example 1.

FIG. 25 illustrates how the moving average profile generation unit 12T2 calculates the average value Ave (p1) while changing the position of the pixel group on the pixel column M. The calculation of this average value is executed while moving the pixel group in the direction from the rear end to the front end of the pixel column M as indicated by the arrow in the figure. By this operation, the moving average of the pixel value on the pixel column M is calculated. This calculation of this average value is not required to be executed over the entire pixel column M. It is sufficient to execute the calculation from the center of the pixel column M to the front end thereof. This is because this section assuredly contains the contour of the subject positioned at the shoulder portion of the subject to be found. The moving average profile generation unit 12T2 creates a moving average profile while moving the pixel group from the rear end of the pixel column to the front end thereof.

Figure 26:
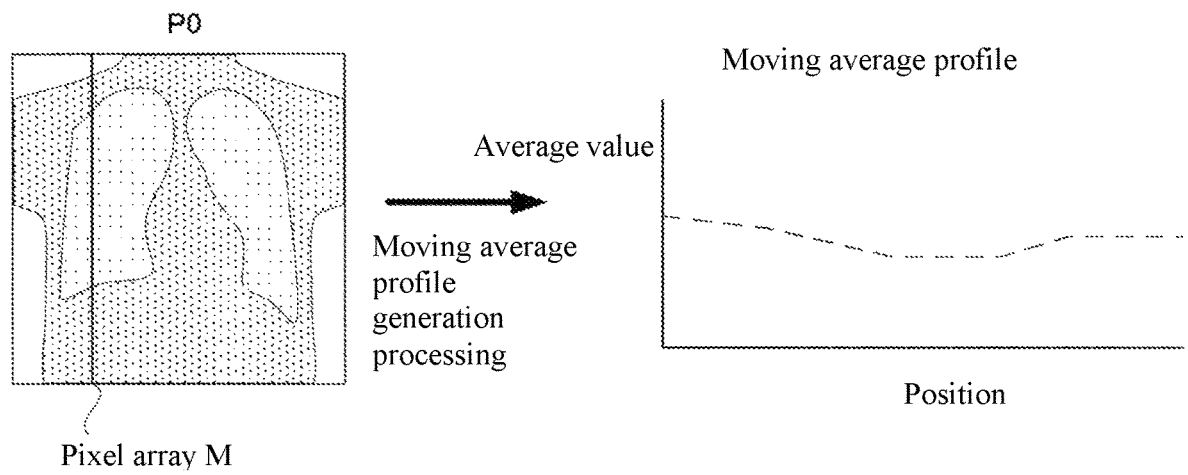
FIG. 26 is a schematic diagram illustrating an operation of an upper side area setting unit according to Example 1.

FIG. 26 shows how the moving average profile generation unit 12T2 generates a profile associating the average value of the pixel group belonging to the pixel column M and the position of each pixel group. This profile will be referred to as a "moving average profile". The position of each pixel group specifically denotes the position of each target pixel corresponding to each pixel group.

The moving average profile generation unit 12T2 generates a moving average profile indicating the relationship between the position of each target pixel and the moving average of the corresponding pixel value by setting the target pixel positioned at the head portion of the pixel group, calculating the moving average of the pixel values of the target pixel by averaging the pixel values of the pixels constituting the pixel group, thereafter sequentially calculating the moving average of the pixel values corresponding to the target pixels while moving the pixel group on the pixel column.

<Recognition of Upper End of Lung Field: About Intersection Identifying Unit 12T3>

The pixel value profile and the moving average profile generated by each generation unit 12T1, 12T2 are sent to the intersection identification unit 12T3. The intersection identification unit 12T3 is configured to search the intersection of each profile. This intersection represents the position of the contour of the subject reflected in the original image P0, and therefore this point will be described.

Figure 27:
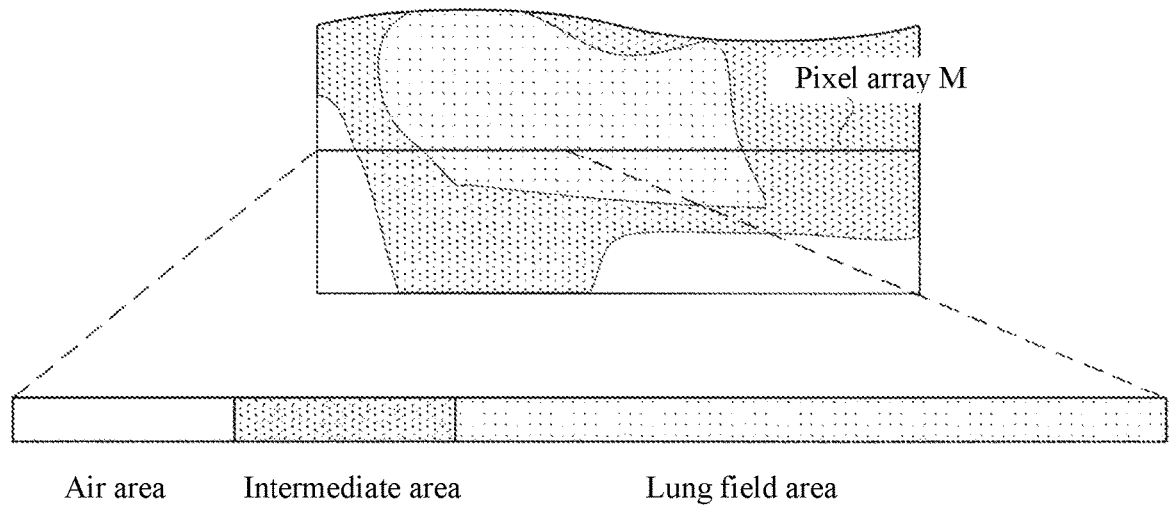
FIG. 27 is a schematic diagram illustrating an operation of an upper side area setting unit according to Example 1.

FIG. 27 specifically illustrates the configuration of the arrangement of the pixel array on the pixel column M. The pixel column M includes an air area in which the air is reflected, a lung field area in which the lung field of the subject is reflected, and an intermediate area positioned between the air area and the lung region in which the shoulder portion of the subject is reflected. The air area is the brightest on the pixel column M because the subject is not reflected. The lung field area is the next brightest area on the pixel array A because the lung of the subject is reflected. The intermediate area is the darkest area because the subject's clavicles and muscles are reflected. The purpose of the operation of the intersection identification unit 12T3 is to find the boundary between the air area and the intermediate area.

Figure 28:
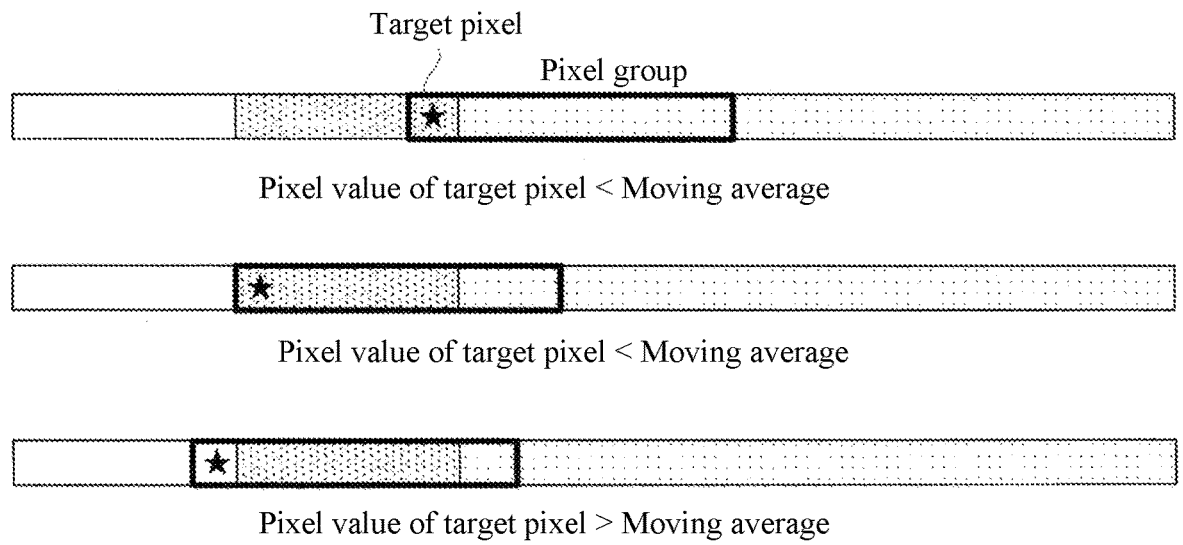
FIG. 28 is a schematic diagram illustrating an operation of an upper side area setting unit according to Example 1.

FIG. 28 shows how the magnitude relation of each profile changes with the position of the target pixel. In FIG. 28, the target pixel is indicated by an asterisk and the pixel group is indicated by a thick frame. The width of the pixel group is set so as to be longer than the width of the intermediate area. Therefore, the pixel group located at the position including the entire area of the intermediate area will protrude to the area next to the intermediate area.

First, as shown in the upper part in FIG. 28, a state is consider in which most of the pixel group is positioned in the lung field area and the head is positioned in the intermediate area. At this state, the pixel is low in pixel value because the target pixel is positioned in the dark intermediate area. On the other hand, the moving average becomes high. This is because most of the pixels constituting the pixel group are positioned in the bright lung field area. Therefore, in the case of the upper part shown in FIG. 28, the pixel value of the target pixel becomes smaller than the moving average.

Thereafter, the calculation of the moving average will be continuously carried out while moving pixel group towards the front end of the pixel column M. After a while, as shown in the middle in FIG. 28, the target pixel reaches the end portion of the intermediate area. At this state, the target pixel is low in pixel value because the target pixel is positioned in the dark intermediate area. On the other hand, the moving average gradually decreases, but it remains high. This is because the pixel group wider than the intermediate area is positioned such that the tail portion protrudes from the intermediate area and is located in the lung field area. Therefore, in the case of the middle portion shown in FIG. 28, the pixel value of the target pixel remains smaller than the moving average.

As the calculation of the moving average is further continued, the target pixel reaches the air area as shown in the lower part of FIG. 28. At this time, the pixel value of the target pixel abruptly increases. On the other hand, the moving average does not change so much. This is because most of the pixels constituting the pixel group are positioned in the dark intermediate area. Therefore, in the case of the lower part in FIG. 28, the pixel value of the target pixel becomes larger than the moving average.

Therefore, to find the boundary between the air area and the intermediate area, it is only necessary to find the position where the magnitude relationship between the pixel value of the target pixel and the moving average is reversed. Where this position comes on the pixel column M can be found by comparing the two profiles. That is, the intersection of the profile appearing when the pixel value profile and the moving average profile are superimposed should be the boundary between the air area and the intermediate area. This is because the pixel value profile is nothing but related to the position of the pixel column M and the pixel value of the target pixel.

Figure 29:
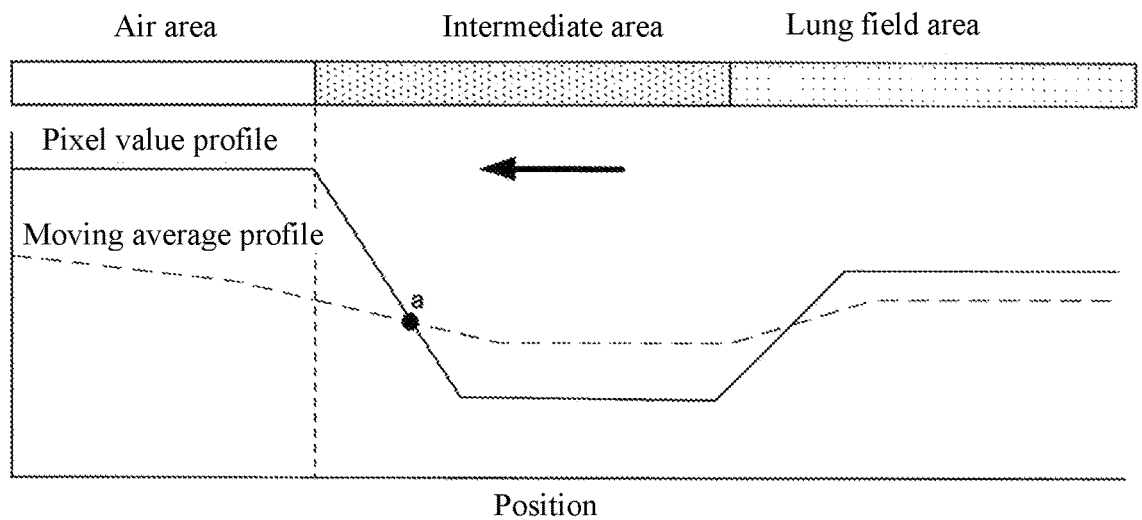
FIG. 29 is a schematic diagram illustrating an operation of an upper side area setting unit according to Example 1.

FIG. 29 illustrates a state in which an actual pixel value profile and an actual moving average profile are superimposed based on this idea. In FIG. 29, the pixel value profile is indicated by a solid line, and the moving average profile is indicated by a broken line. The symbol "a" in FIG. 29 is the intersection in question.

Figure 30:
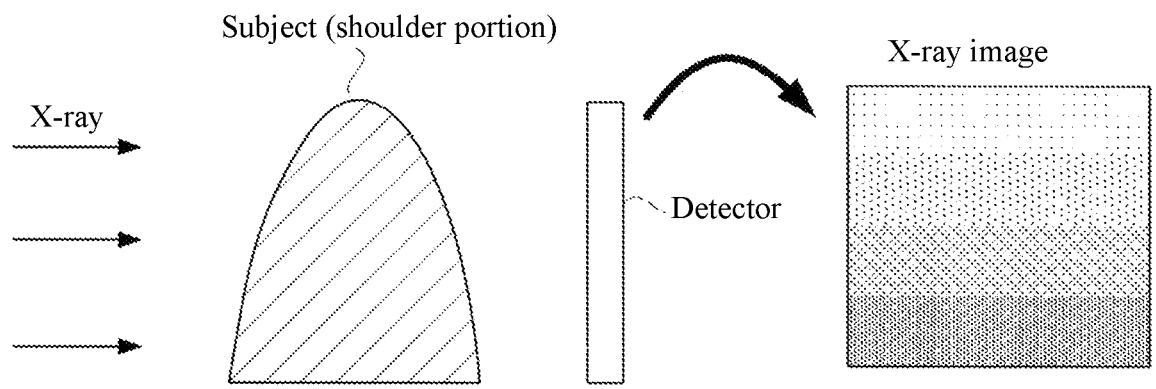
FIG. 30 is a schematic diagram illustrating an operation of an upper side area setting unit according to Example 1.

As will be understood from FIG. 29, the intersection "a" is strictly positioned in the intermediate area. That is, in fact, the description with reference to FIG. 10 is not applied as it is. FIG. 30 explains the reason that such a phenomenon occurs. FIG. 30 illustrates how the X-ray image capturing is performed on the subject's shoulder portion. X-rays are irradiated to the subject from the left side to the right side, passes through the subject's shoulder portion, and is detected by the detector. The subject is facing to the left on the ventral side and facing to the right on the dorsal side. The tip of the shoulder portion of the subject is thin, and therefore the obtained X-ray image becomes an image having a gradation, which becomes brighter from the lower side to the upper side. That is, the periphery of the boundary with the air area in the intermediate area of the pixel column M shown in FIG. 29 becomes gradually brighter toward the air area. This point is different from the simple model described with reference to FIG. 28 in handling the actual original image P0. Therefore, the intersection "a" does not appear at the boundary between the air area and the intermediate area itself, but appears at a position slightly shifted towards the intermediate area.

Figure 31:
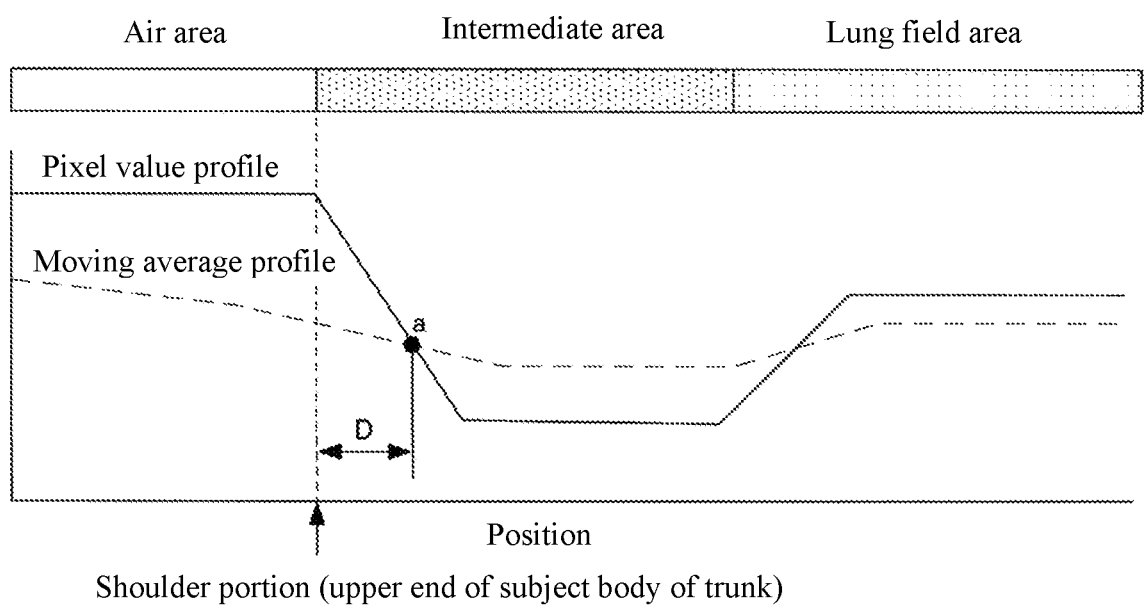
FIG. 31 is a schematic diagram illustrating an operation of an upper side area setting unit according to Example 1.

In view of such circumstances, as shown in FIG. 31, in the configuration of the present invention, it is configured such that a position shifted from the intersection "a" in the direction of the air area by a predetermined distance D is recognized as a boundary between the air area and the intermediate area. This will be described later.

By the way, looking at FIG. 29, it is noticed that there are two intersections between the pixel value profile and the moving average profile. One of them is the intersection "a", which appears near the boundary between the air area and the intermediate area. The other is an intersection appearing around the boundary between the intermediate area and the lung field area. This means that the target boundary between the air area and the intermediate area cannot be accurately identified without accurately distinguishing these two intersections.

The intersection identification unit 12T3 of the present invention is configured to search only the intersection where the profile reversal in which the pixel value profile below the average profile passes and exceeds the moving average profile occurs when comparing the two profiles in the direction from the inside of the subject toward the air area (see the arrow in FIG. 29). Such an intersection is an intersection appearing around the boundary between the air area and the intermediate area that conform to the principle described with reference to FIG. 30. Based on this principle, the intersection identification unit 12T3 distinguishes the boundary between the intermediate area and the lung field area and the boundary between the air area and the intermediate area.

<Recognition of Upper End of Lung Field: Relationship Between Intersection and Pacemaker Image>

The aforementioned operation of the intersection identification unit 12T3 is sufficient as a configuration for finding the boundary between the air area and the intermediate area in the X-ray image. However, when a cardiac pacemaker is reflected in the X-ray image, it can happen that the intersection searched by the intersection identification unit 12T3 will not appear near the boundary between the air area and the intermediate area. The reason why such a phenomenon occurs will be described.

Figure 32:
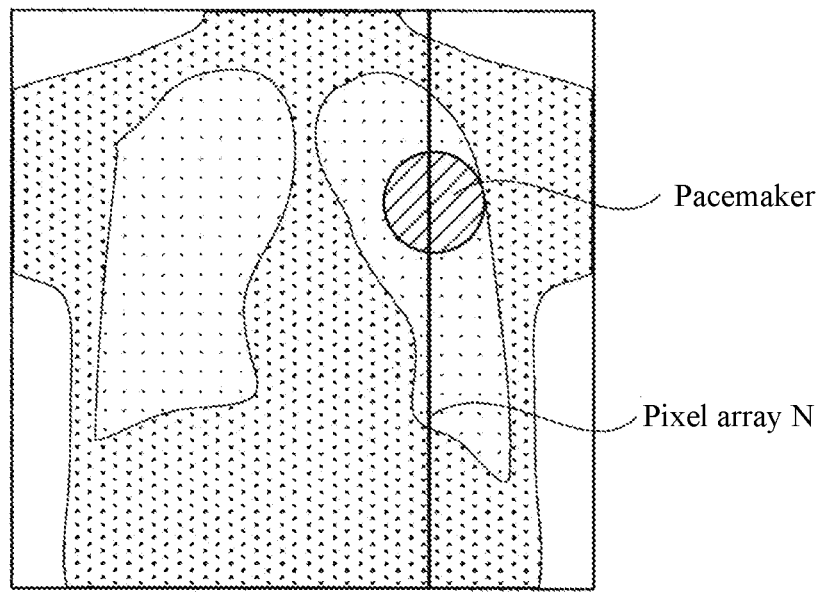
FIG. 32 is a schematic diagram illustrating an operation of an upper side area setting unit according to Example 1.

As shown in FIG. 32, the pacemaker image is reflected at the position surrounded by the lung field. Therefore, both the top portion and the bottom portion of the pacemaker image are in the lung field. A case will be considered in which a pixel column M is set so as to penetrate this pacemaker image.

Figure 33:
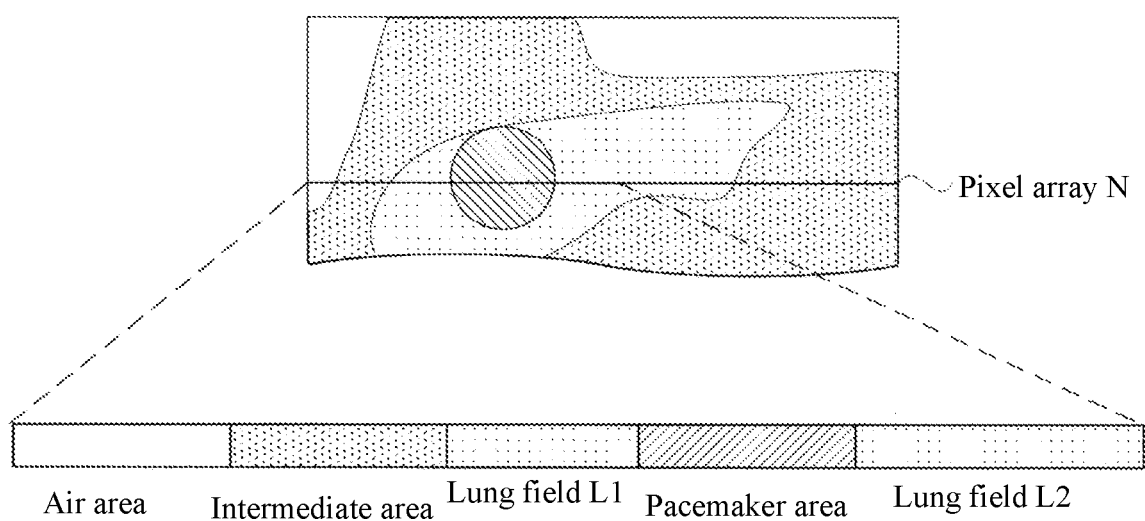
FIG. 33 is a schematic diagram illustrating an operation of an upper side area setting unit according to Example 1.

FIG. 33 specifically illustrates the configuration of the arrangement of the pixel array on the pixel column N. The pixel column N includes an air area in which the air is reflected in the same manner as in FIG. 9, a lung field area the lung field of the subject is reflected, and an intermediate area positioned between the air area and the lung area in which the shoulder portion of the subject is reflected. The difference from FIG. 27 is that the pacemaker area related to the pacemaker image is inserted in the lung field area. Arranging the areas on the pixel column N, it is arranged in the dark order of the pacemaker area, the intermediate area, the lung field area, and the air area. The lung field area is divided by the pacemaker area. In the divided lung field area, the area fragment near the intermediate area will be referred to as a lung field area L1, and the area fragment far from the intermediate area will be referred to as a lung field area L2.

Figure 34:
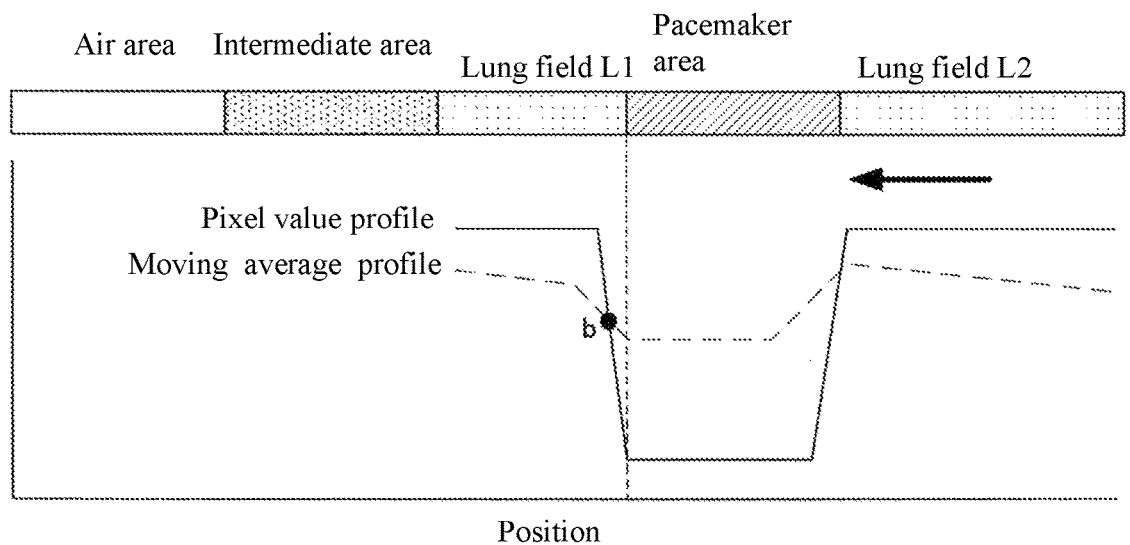
FIG. 34 is a schematic diagram illustrating an operation of an upper side area setting unit according to Example 1.

FIG. 34 illustrates the pixel value profile and the moving average profile related to the pixel column N in a superimposed manner. To be noted at this time is the boundary between the lung field area L1 and the pacemaker area. The pixel value profile indicates a low value indicating the dark pacemaker area, while the moving average profile is dragged by the bright lung field area L2 and takes a high value. However, the pixel value profile in the lung field area L1 is higher than the moving average profile. The pixel value profile shows a high value indicating the bright lung field area L1, while the moving average profile is drawn by the dark pacemaker area and takes a low value. Therefore, at the boundary between the lung field area L1 and the pacemaker area, inversion occurs between the pixel value profile and the moving average profile.

When comparing two profiles in the direction from the inside of the subject to the air area (see the arrow in FIG. 34), the pixel value profile which was below the moving average profile passes and exceeds the moving average profile, so that the inversion of the profile occurs. Therefore, the intersection b satisfies all of search conditions held by the intersection identification unit 12T3.

Under such circumstances, when a pacemaker image is reflected in the X-ray image, there is a possibility that the intersection identification unit 12T3 searches the intersection "b" near the boundary between the lung field area L1 and the pacemaker area. Therefore, according to the present invention, it is configured to search an intersection for each of a plurality of pixel columns different in position and identify an intersection positioned closest to the subject's head (on the air area side) among the intersections as an intersections positioned near the boundary between the air area and the intermediate area to thereby prevent occurrence of misidentification described above.

Figure 35:
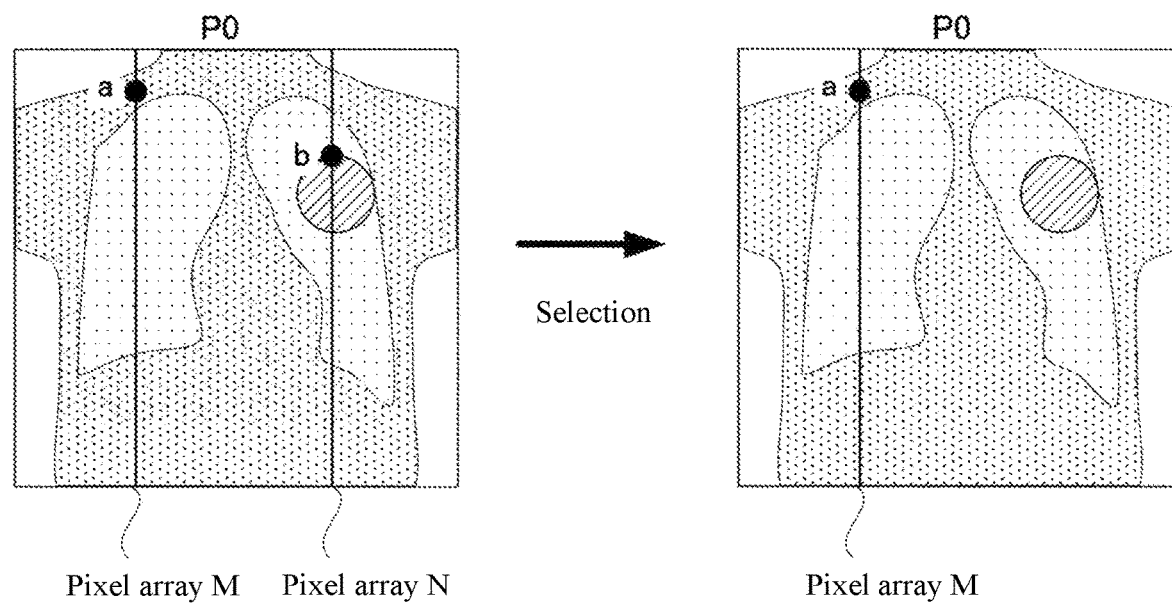
FIG. 35 is a schematic diagram illustrating an operation of an upper side area setting unit according to Example 1.

FIG. 35 illustrates how the intersection identification unit 12T3 ultimately selects one intersection from a plurality of intersections. It is assumed that an intersection search was performed for a pixel column M and a pixel column N extending in parallel with each other, an intersection "a" was found for the pixel column M, and an intersection "b" was found for the pixel column N. The intersection identification unit 12T3 recognizes that the intersection "a" on the side closer to the air area among intersections "a" and "b" is the final search result and treats that the intersection "b" is not found. The intersection identification unit 12T3 executes the search operation on the plurality of pixel arrays extending in parallel to each other to thereby identify the intersection positioned on the most front end side of the pixel column among intersections different in origin pixel column.

By performing such an operation, the intersection identification unit 12T3 does not falsely recognize the boundary between the lung field area L1 and the pacemaker area as the boundary between the air area and the intermediate area. This is because the boundary between the lung field area L1 and the pacemaker area should appear at a position far from the air area compared with the boundary between the air area and the intermediate area and will not become a selection target by the intersection identification unit 12T3.

<Recognition of Upper End of Lung Field: Relationship Between Intersection and Annotation Image>

Figure 58:
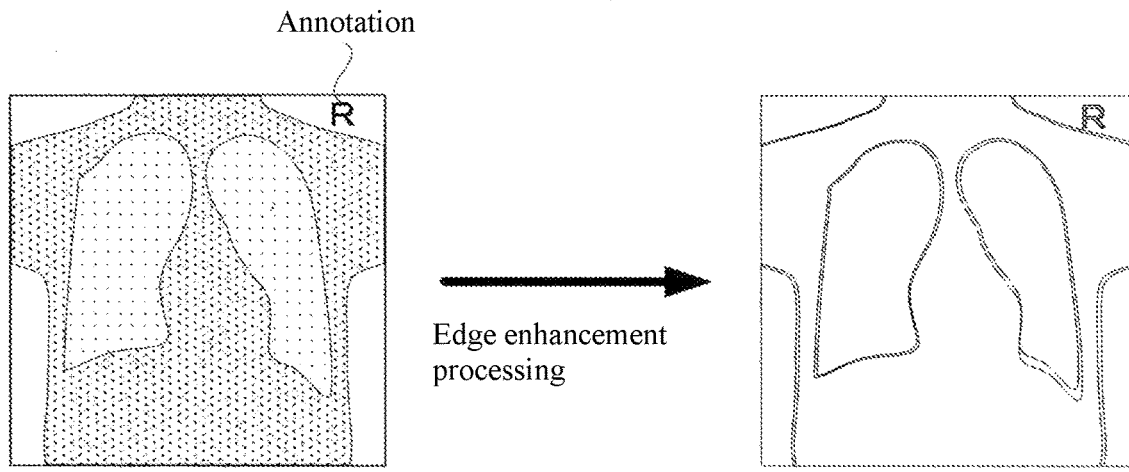
FIG. 58 is a schematic diagram illustrating problems occurring in conventional image processing.
Figure 59:
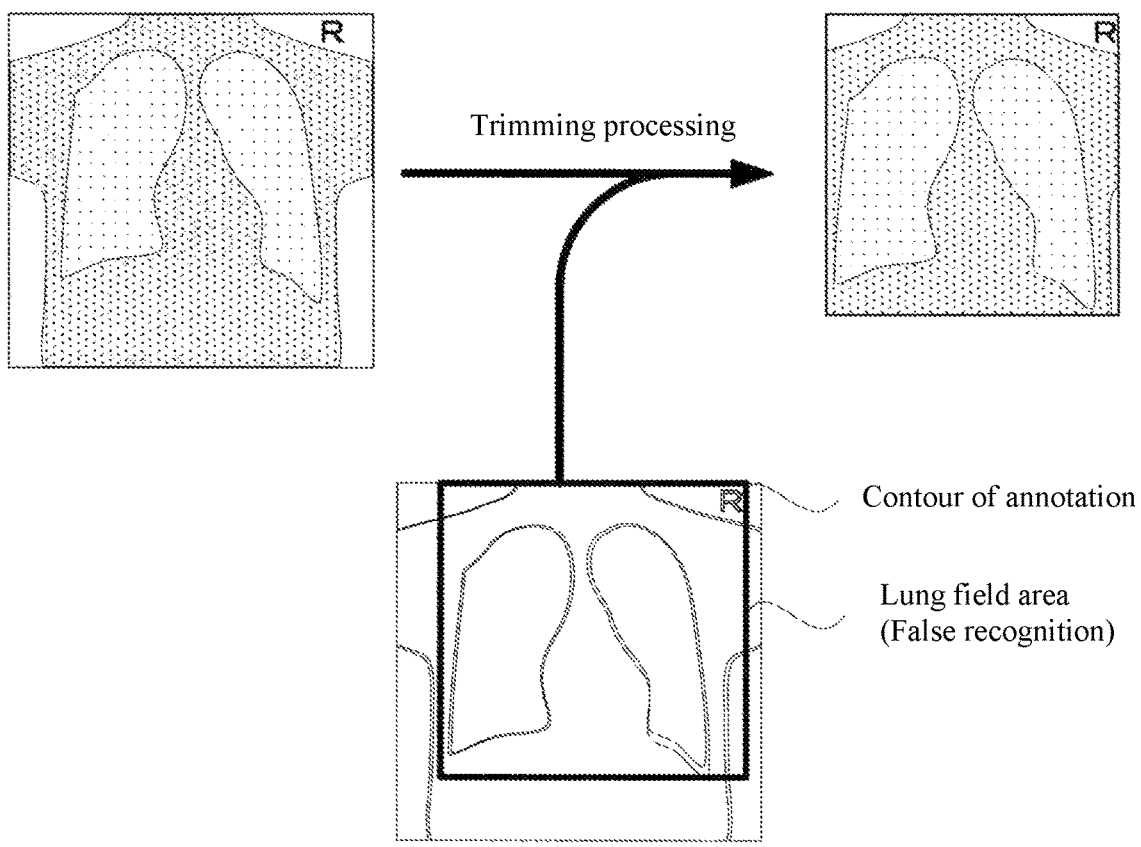
FIG. 59 is a schematic diagram illustrating problems occurring in conventional image processing.

Next, the relationship between the intersection and the annotation will be described. An annotation denotes a figure to be inserted in the air area of the X-ray image, such as, the letter "R" shown in FIG. 58. It can happen that an inversion occurs between the pixel value profile and the moving average profile in the vicinity of this annotation. Therefore, it is considered that when an annotation image is reflected in an X-ray image, an intersection of both profiles occurs at the boundary between the annotation image and the air area as described in FIG. 34 and this intersection become indistinguishable from the intersection occurred at the boundary between the air area and the intermediate area.

In this regard, according to the present invention, it is configured such that as for a certain pixel column M, in cases where there are a plurality of intersections where an inversion of profiles such that the pixel value profile below the moving average profile passes the moving average profile when comparing two profiles in the direction from the inside of the subject toward the air area (see the arrow in FIG. 11), the intersection identification unit 12T3 recognizes that the intersection closer to the lung field area among these intersections is a search result for the pixel column M and processes as not having found any other intersections.

Figure 36:
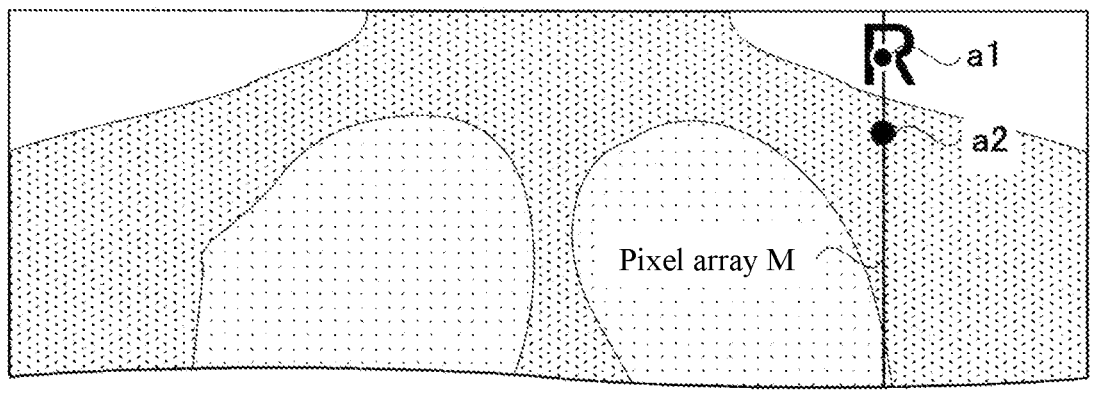
FIG. 36 is a schematic diagram illustrating an operation of an upper side area setting unit according to Example 1.

In the example of FIG. 36, since the intersection a2 is closer to the lung field area than the intersection a1, the intersection identification unit 12T3 recognizes that the intersection a2 is an intersection related to the pixel column M. By performing such an operation, the intersection identification unit 12T3 does not falsely recognize the boundary between the air area and the annotation as the boundary between the air area and the intermediate area. The boundary between the air area and the annotation should appear at a position far from the lung field area as compared with the boundary between the air area and the intermediate area, and will not become a recognition target of the intersection identification unit 12T3. The intersection identification unit 12T3 searches the most rear end side intersection of the pixel arrangement in cases where an intersection of both profiles appears on the same pixel arrangement at a position where the pixel value profile passes the moving average profile in the direction from the rear end toward the front end in the pixel column.

As an actual operation of the intersection identification unit 12T3, it may be configured such that the comparison of both profiles is sequentially performed from the rear end of the pixel column M toward the front end thereof (in the direction from the lung field area to the air area), the intersection found for the first time is recognized as the search result, and the search is completed at this point of time. Therefore, the intersection a1 shown in FIG. 36 is not always found by the intersection identification unit 12T3. In the case of this configuration, the intersection identification unit 12T3 ends the operation without recognizing even the existence of intersection a1.

The intersection identification unit 12T3 identifies the intersection "a" based on such search condition and sends the position information of the intersection "a" in the pixel column M to the shift unit 12T4. That is, as shown in FIG. 31, the shift 12T4 sets the position moved from the position of the intersection "a" by the predetermined distance D in the direction from the intermediate area to the air area as a trimming position. The shift unit 12T4 sets the position on the radiation image on the front end side of the pixel column by the predetermined width than the intersection to to the position related to the upper end of the contour of the subject which is reflected in the original image P0.

Figure 37:
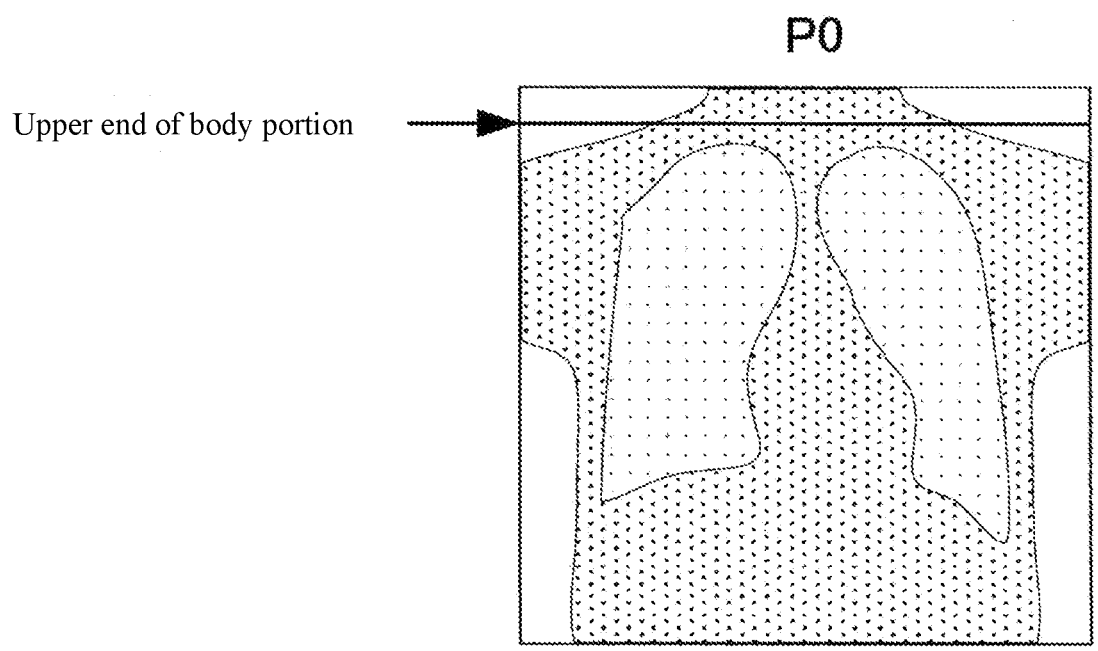
FIG. 37 is a schematic diagram illustrating an operation of an upper side area setting unit according to Example 1.

FIG. 37 shows the upper end of the body portion set by the shift unit 12T4. The upper end of the body portion represents the position of the subject's shoulder and is reflected above the lung field. This is because, in the original image P0, the subject's shoulder is reflected above the lung field. Also, the upper end of the body part is reflected below the jaw of the subject. This is because, in the original image P0, the subject's shoulder is reflected below the jaw. In other words, the upper end of the body part is positioned at a position which separates the jaw of the subject and the lung field.

Figure 38:
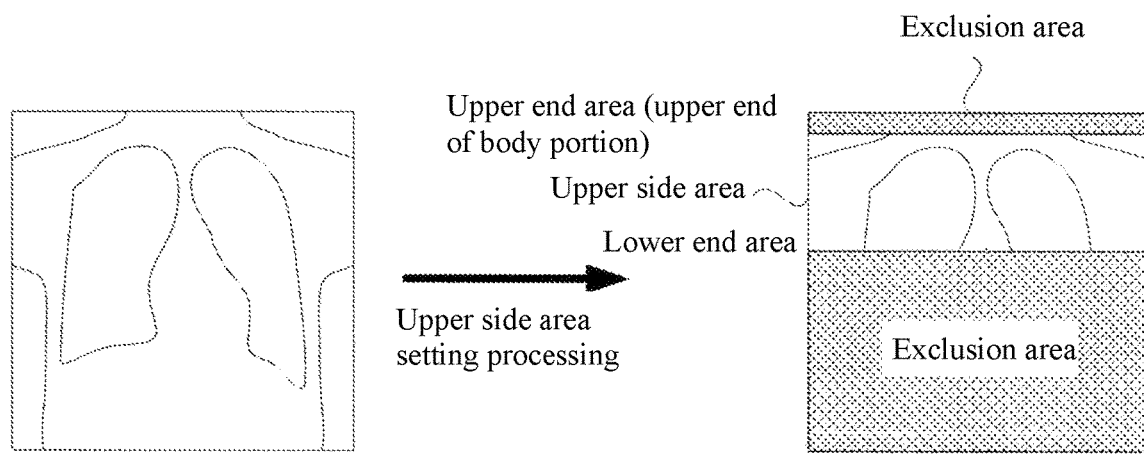
FIG. 38 is a schematic diagram illustrating an operation of an upper side area setting unit according to Example 1.

FIG. 38 shows how the upper side area setting unit 12T sets the upper side area based on the upper end of the body portion set by the shift unit 12T4. The upper side of the upper side area is set to the position of the upper end of the body portion. The position of the lower side of the upper side area may be preset before acquisition of the original image P0.

The lung field upper end recognition unit 13T searches the portion corresponding to the upper end of the lung field from the total value profile PY. However, since the total value profile PY is a profile for the entire original image P0, it also includes an area not necessary for searching the upper end of the lung field. Therefore, in the present invention, as shown in FIG. 38, the upper side area setting unit 12T is configured to predict the rough position of the upper end of the lung field and set an area including the upper end of the lung field in the original image P0. The area including this upper end is the upper side area. The right side, and the left side of the upper side area coincide with the right side and the left side, and the lower side is set to the position (position crossing) passing through the lung field. Therefore, in the lung field, which is reflected in the lower side area, the lower side is missing. The position on the image of the lower side may be preset before acquiring the original image P0.

Looking at FIG. 38, it is noted that the upper side of the upper side area does not coincide with the upper side of the original image. This phenomenon occurs because the upper side area setting unit 12T sets the upper end of the body portion recognized by the shift unit 12T4 to the upper side of the upper side area. With this, the jaw of the subject can be excluded from the upper side area. In this way, the upper side area setting unit 12T sets the upper side area by excluding the jaw of the subject. According to the configuration of the present invention, the jaw of the subject is not falsely recognized as the upper end of the lung field. This is because the upper end search is performed by treating that the upper end of the lung field does not exist in the subject jaw. The details of the false recognition that occurs when recognizing the upper end of the lung field have been described with reference to FIG. 18.

In the original image P0, the area other than the upper side area will be referred to as an exclusion area. This exclusion area is distributed upper and lower in the original image P0. Therefore, the upper side area exists at the position sandwiched between the two exclusion areas in the vertical direction.

Figure 39:
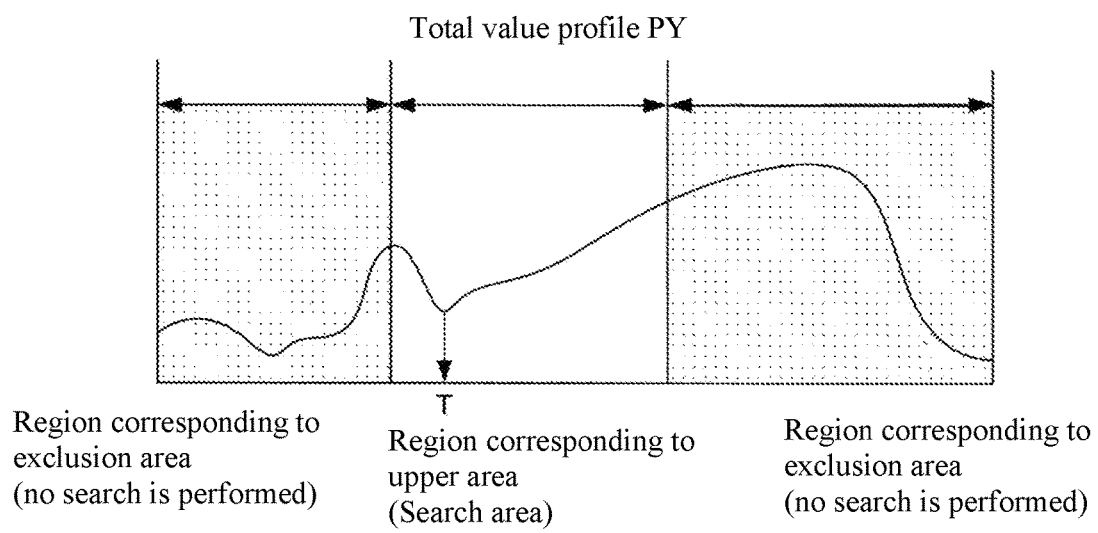
FIG. 39 is a schematic diagram illustrating the operation according to the lung field upper end recognition of Example 1.

The data indicating the position of the upper side area is sent to the lung field upper end recognition unit 13T. As shown in FIG. 39, the lung field upper end recognition unit 13T recognizes the range on the total value profile PY corresponding to the upper side area as a search range which is a range for searching the upper end of the lung field and does not perform a search on the range on the total value profile PY corresponding to the exclusion area described in FIG. 38.

Figure 40:
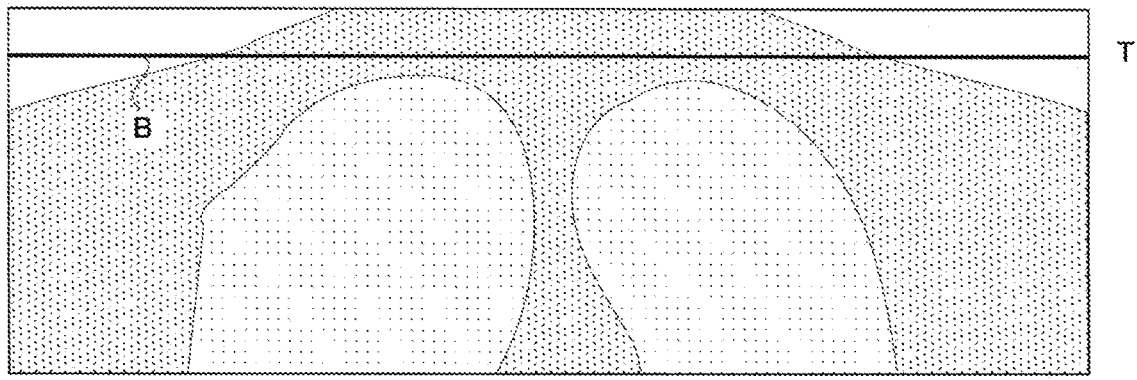
FIG. 40 is a schematic diagram illustrating the operation according to the lung field upper end recognition of Example 1.

As shown in FIG. 39, the lung field upper end recognition unit 13T searches a position T where the total value is the lowest in the search range on the total value profile PY, and recognizes the position T as the upper end of the lung field left. The position with the lowest total value on the total value profile PY indicates the position of the pixel column in which the trunk of the body of the subject is reflected throughout the array and the lung field is not included. This position is very close to the lung field although it is located outside the lung field. The reason for this is described in FIG. 40. FIG. 40 illustrates a case in which the pixel column B described in FIG. 16 is positioned at the position T. When the pixel column B is moved upward from the position T, the total value corresponding to the pixel column B gradually increases. This is because as the pixel column B is moved towards the subject's head, the dark shoulder portion gradually decreases, causing the bright air portion to increase. When the pixel column B is moved downward from the position T, the total value corresponding to the pixel column B gradually increases. This is because as the pixel column B is moved towards the lung field, the dark shoulder portion gradually decreases, causing the bright lung field portion to increase.

Figure 41:
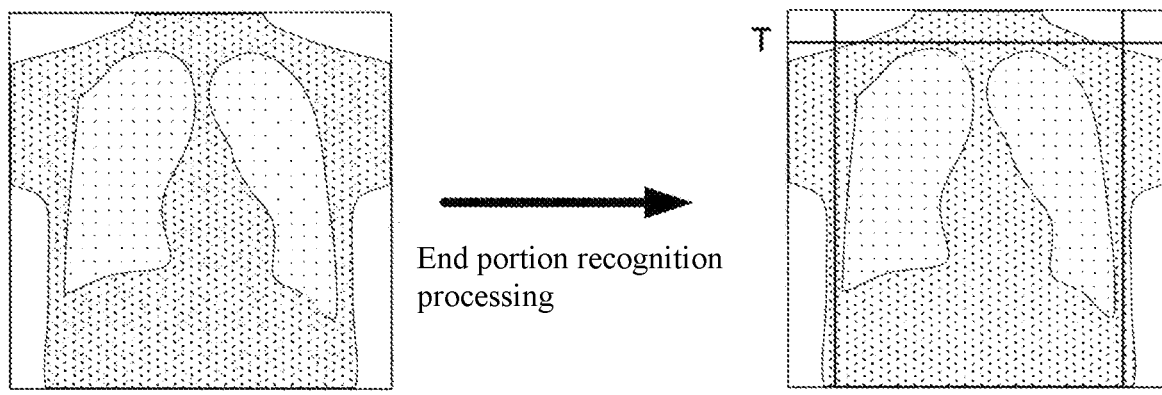
FIG. 41 is a schematic diagram illustrating an intermediate stage of an operation related to the lung field recognition of Example 1.

FIG. 41 collectively illustrates the recognition of the end portions of the lung field, which have been described so far. With the lung field right end recognition unit 13R, the lung field left end recognition unit 13L, and the lung field upper end recognition unit 13T, the ends of the lung field in the original image P0 were recognized in the right, left, and upper directions.

<Recognition of Lower End of Lung Field>

Lastly, the recognition of the lower end of the lung field in the present invention will be described. For recognizing the lower end of the lung field, a total value profile PY is required. This is because when trying to find the upper and lower ends of the lung field, it is not necessary to perform the processing in the horizontal direction of the image described in FIG. 8 to FIG. 15, but necessary to perform the processing in the vertical direction rotated by 90 degrees.

Figure 42:
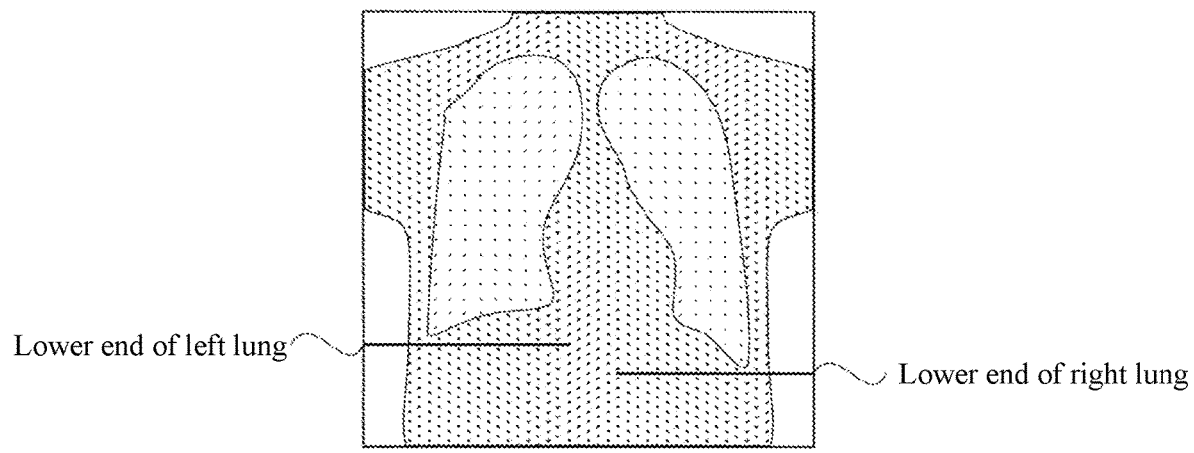
FIG. 42 is a schematic diagram for explaining problems occurring during lung field lower end recognition according to Example 1.

The recognition of the lower end of the lung field has a special circumstance different from the right end, left end, and upper end of the lung field described above. That is, as shown in FIG. 42, the lower end of the right lung and the lower end of the left lung do not always coincide. Such a circumstance is not convenient when trying to extract the whole lung area from the original image P0. In the case of FIG. 42, the right lung extends downward from the left lung. Therefore, it is necessary to set the lower end of the right lung to the lower end of the lung field. If the lower end of the left lung is set to the lower end of the lung field, the lower side of the right lung will be cut off when cutting out the lung field from the original image P0.

Figure 43:
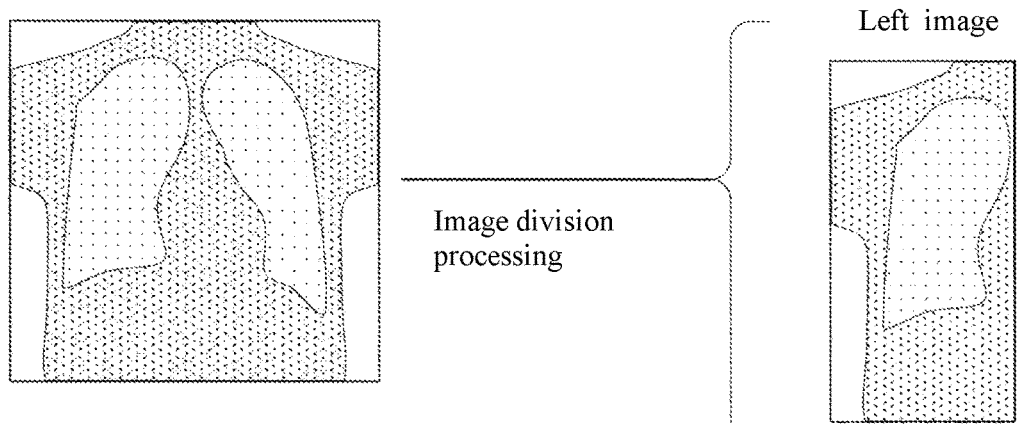
FIG. 43 is a schematic diagram illustrating the operation according to the lung field lower end recognition of Example 1.

Therefore, to recognize the lower end of the lung field, the original image P0 is configured to divide into a right half and a left half. FIG. 43 shows how the image dividing unit 10 (see FIG. 7) bisects the original image P0 vertically to generate a right image in which the right lung is reflected and a left image in which the left lung is reflected.

<Recognition of Lower End of Lung Field: Image Processing on Left Image>

Figure 44:
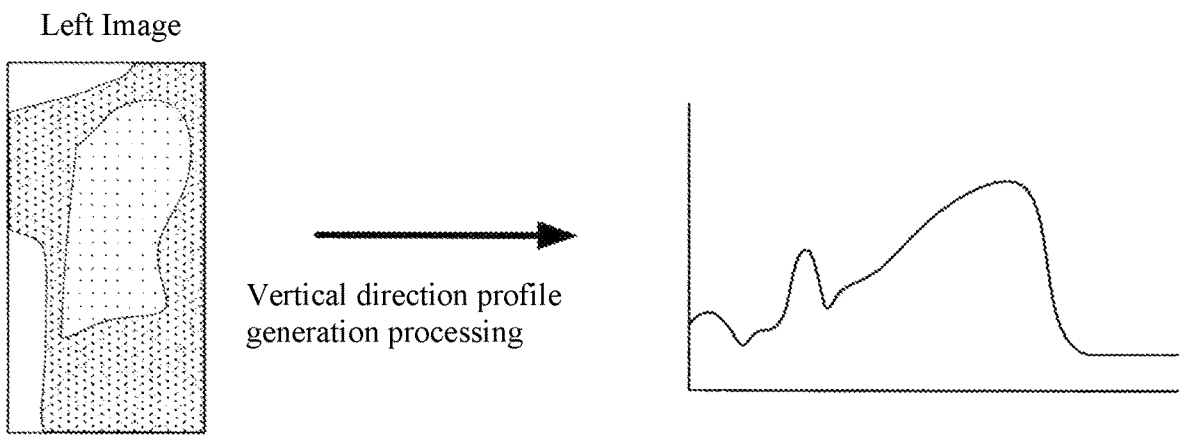
FIG. 44 is a schematic diagram illustrating the operation according to the lung field lower end recognition of Example 1.

Hereinafter, the image processing for the left image in which the left lung is reflected will be described. FIG. 44 shows how the total value profile PYL is generated based on the left image. In the left image, since pixels are arranged vertically and horizontally, it can be understood that the horizontally extending pixel column is arranged in the vertical direction in the left image. The vertical direction profile generation unit 11Y calculates the total value on these pixel columns, and generates the profile in which the position of the pixel column and the total value are related as shown in FIG. 17. This profile is a total value profile PYL. The total value profile PYL is sent to the lung field lower end recognition unit 13U.

Figure 45:
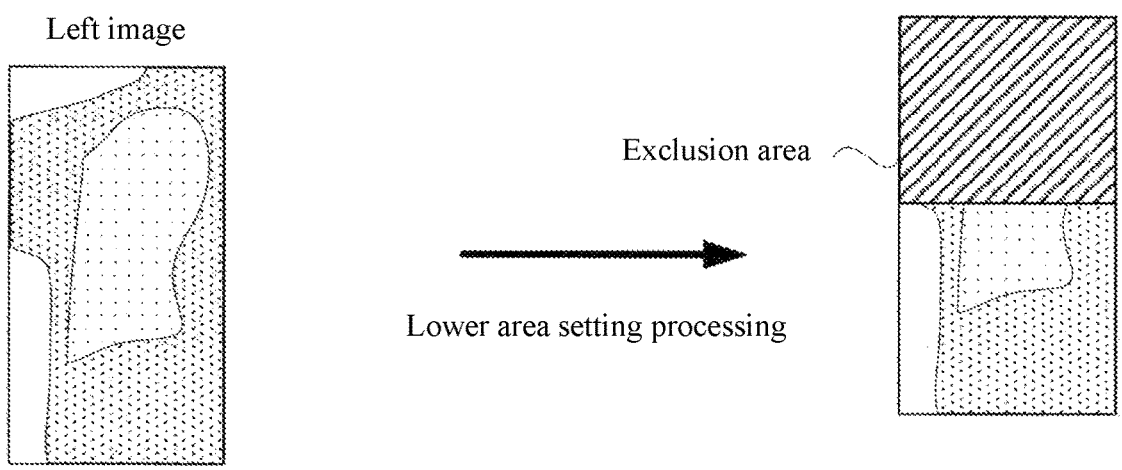
FIG. 45 is a schematic diagram illustrating the operation according to the lung field lower end recognition of Example 1.

The lung field lower end recognition unit 13U searches the portion corresponding to the lower end of the lung from the total value profile PYL. However, since the total value profile PYL is a profile for the entire left image, it also includes an area not necessary for searching the lower end of the lung field. Therefore, in the present invention, as shown in FIG. 45, the lower side area setting unit 12U is configured to predict the rough position of the lower end of the lung field and set an area including the lower end (the end portion of the lung field positioned on the lower end side of the image) of the lower end of the left lung on the left image. The area including this lower end will be referred to as the lower side area. The lower side, the right side, and the left side of the lower side area coincide with the lower side, the right side, and the left side, and the lower side, and is set to the position (position crossing) passing through the lung field. Therefore, the left lung reflected in the lower side area lacks the upper side. In the original image P0, the area other than the lower side area will be referred to as an exclusion area and belongs particularly to the jaw and the shoulder portion of the subject. The position on the image of the lower side area may be preset before acquiring the original image P0.

Figure 46:
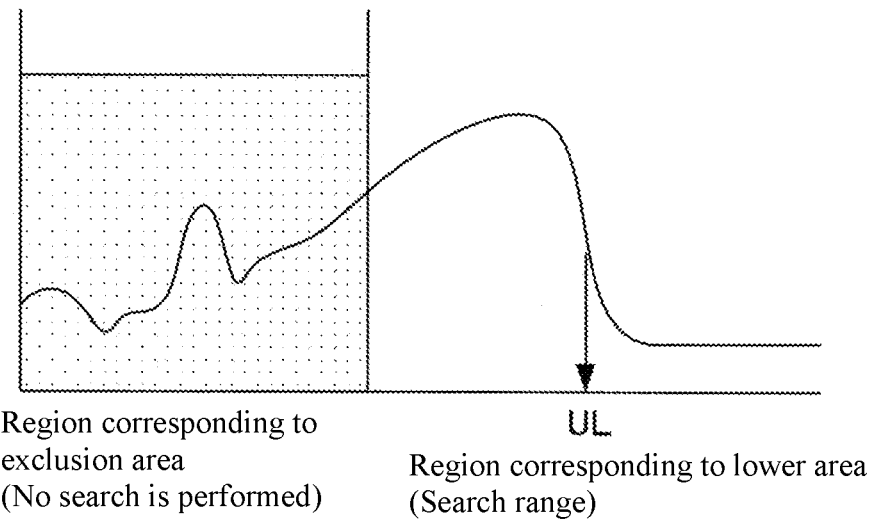
FIG. 46 is a schematic diagram illustrating the operation according to the lung field lower end recognition of Example 1.

The data indicating the position of the lower side area is sent to the lung field lower end recognition unit 13U. As shown in FIG. 46, the lung field lower end recognition unit 13U recognizes the range on the total value profile PYL corresponding to the lower side area as a search range which is a range for searching the upper end of the lung field and does not perform a search on the range on the total value profile PYL corresponding to the exclusion area described in FIG. 45.

Here, a special circumstance concerning the recognition of the lower end of the lung field will be described. The search of the right end, the left end, and the upper end of the lung field was made by searching the position where the total value was the lowest from the range defined on the total value profile. Such a search method does not apply to the search for the lower side of the lung field. The reason is that low values of the total value gather on the right side of the total value profile PYL shown in FIG. 46. This part corresponds to the lower side portion of the lung field on the left image. This portion is a portion in which the inner parts of the subject are filled. The inner parts of the subject are less likely to pass radiation as compared with the lung field, and are widely distributed as a dark shadow on the lower side of the left image. Therefore, on the right side of the total value profile PYL shown in FIG. 46, low total values continuous and it is impossible to distinguish which portion corresponds to the lower end of the lung field.

Therefore, the lower end of the lung field is determined based on the differential value of the total value profile PYL. That is, the lung field lower end recognition unit 13U differentiates the total value profile PYL by the position, finds the position where the differential value is the lowest, and recognizes this position as the lower end UL. The position where the differential value is lowest appears at the boundary between the lung field and the diaphragm. At first glance, the influence of the pacemaker and the annotation is concerned. However, at the lower end of the lung field, unlike the upper end, the right end, and the left end, the pacemaker and the annotation are not positioned in the vicinity. Therefore, with respect to the lower end, no false recognition will occur under the influence of the pacemaker and the annotation even with such a recognition method.

<Recognition of Lower End of Lung Field: Image Processing on Right Image>

Figure 47:
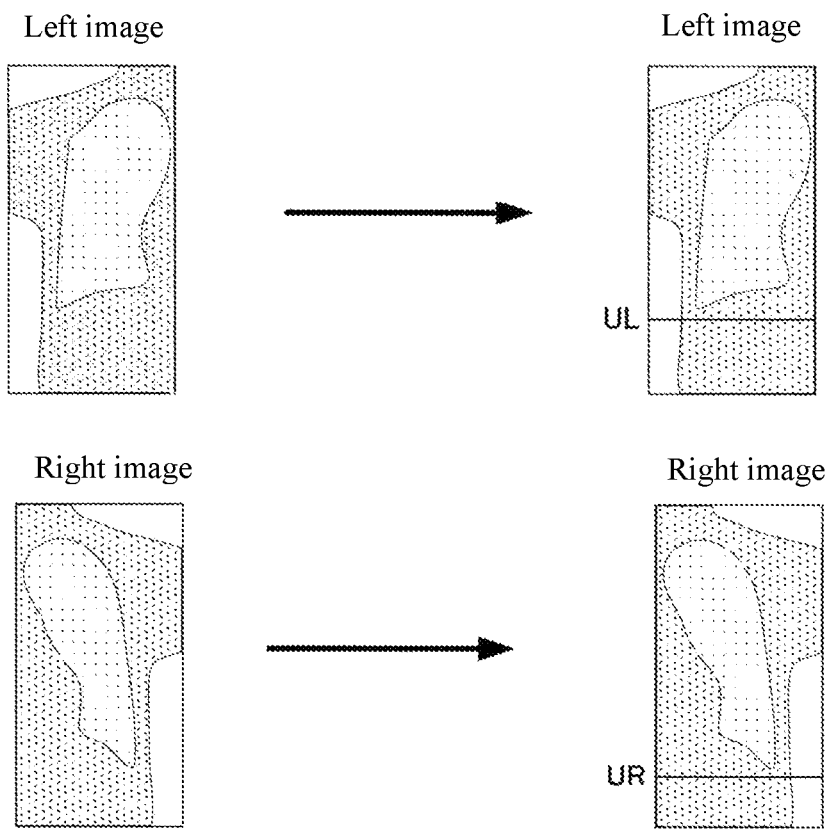
FIG. 47 is a schematic diagram illustrating the operation according to the lung field lower end recognition of Example 1.

The vertical direction profile generation unit 11Y, the lower side area setting unit 12U, and the lung field lower end recognition unit 13U apply the same image processing to the right image described with reference to FIG. 43 as the image processing performed on the left image. As a result, the lower end of the lung field is also recognized for the right lung reflected in the right image. FIG. 47 shows a state in which the lower end UL of the left lung is recognized in the left image and a state in which the lower end UR of the right lung is recognized in the right image.

<Recognition of Lower End of Lung Field: Recognition of Lower End for Lung Field>

Figure 48:
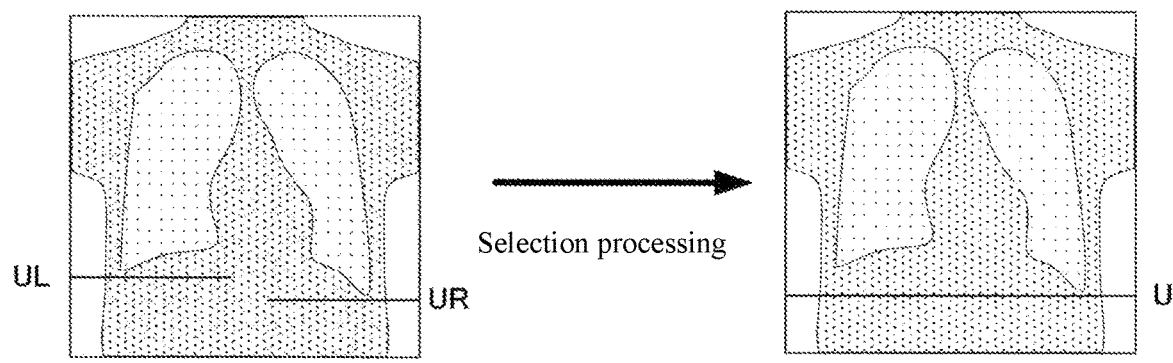
FIG. 48 is a schematic diagram illustrating the operation according to the lung field lower end recognition of Example 1.

The lung field lower end recognition unit 13U recognizes the lower end of the entire lung field based on the lower end UL of the left lung and the lower end UR of the right lung. That is, as shown in FIG. 48, the lung field lower end recognition unit 13U compares the lower end UL of the left lung with the lower end UR of the right lung, and recognizes the one positioned on the lower side of the original image P0 as the lower end U of the lung field. The lung field lower edge recognition unit 13U according to the present invention recognizes the lower end UL of the left lung, recognizes the lower end UR of the right lung, compares the position of the lower end UL of the left lung in the original image P0 image with the position of the lower end UR of the right lung, and recognizes the one positioned on the lower side of the image as the lower end U of the lung filed.

By this operation of the lung field lower end recognition unit 13U, the lower end of the lung field is determined based on one of lungs which extending on the lower side of the original image P0 among both lungs constituting the lung field. Therefore, a part of the lung field will not be lost when trimming is performed.

Figure 49:
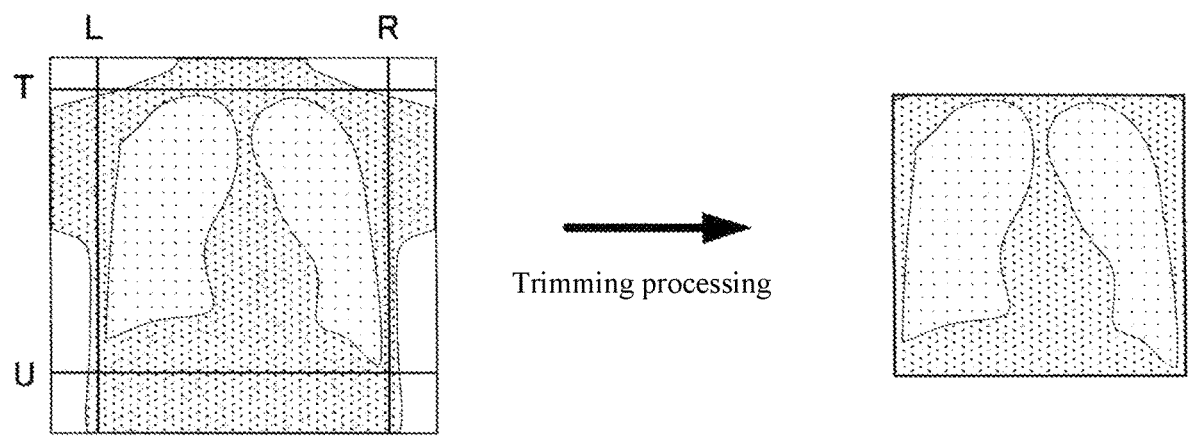
FIG. 49 is a schematic diagram illustrating a trimming operation according to Example 1.

The left side of FIG. 49 collectively illustrates the recognition of the end portion of the lung field, which has been described above. With the lung field right end recognition unit 13R, the lung field left end recognition unit 13L, the lung field upper end recognition unit 13T, and the lung field lower end recognition unit 13U, the ends of the lung field on the original image P0 were recognized in the right, left, and upper and lower directions. Such a method of recognizing the ends of the lung field is convenient when executing the trimming processing of cutting out the entire lung field from the original image P0. The right end R, left end L, upper end T, and lower end U are all positioned outside the lung field, so that even if the image is cropped at the positions, no part of the lung field will be cut.

<Operation of Trimming Unit 14>

The data indicating the positions of the upper, lower, left, and right ends of the lung field recognized by the end recognition unit 13 is sent to the trimming unit 14. As shown in FIG. 49, the trimming unit 14 performs trimming processing of the original image P0 based on the four ends of the lung field to generate a trimmed image such that the four edges of the lung field are at the edges of the image. The trimmed image is obtained by cutting out the lung field for each perimeter from the original image P0. The trimming unit 14 generates a trimmed image in which an image of the lung field area is extracted from the original image P0 based on the positions of the ends of the lung or area specified by the lung field left end recognition unit 13L, the lung field right end recognition unit 13R, the lung field upper end recognition unit 13T, and the lung field lower end recognition unit 13U.

The trimmed image is sent to the lung field luminance adjustment unit 15. The lung field luminance adjustment unit 15 performs the luminance adjustment for the entire trimmed image. By this operation, in the lung field, the light and shade will be assuredly enhanced and the visibility will be improved.

<Effects of the Invention>

Figure 50:
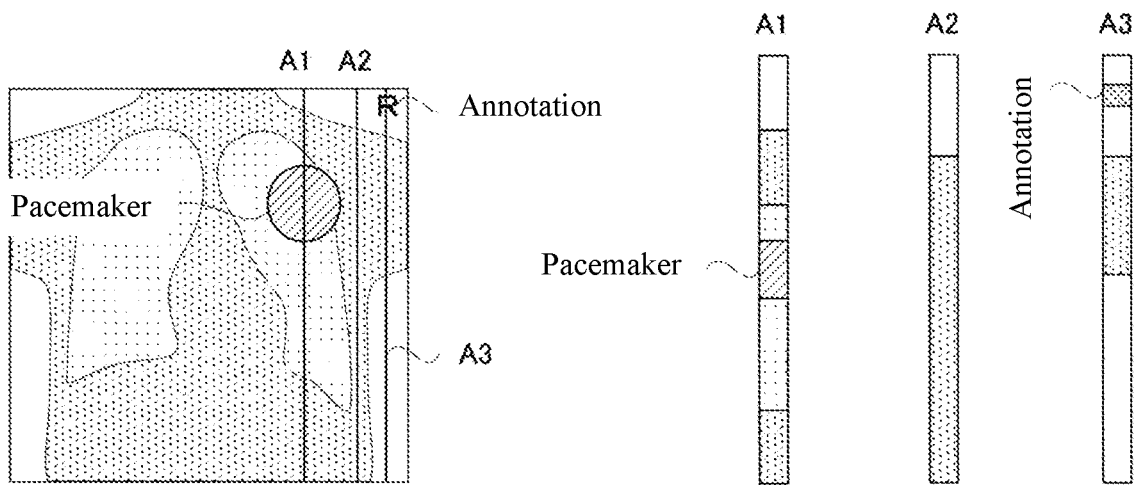
FIG. 50 is a schematic diagram for explaining an effect according to Example 1.
Figure 51:
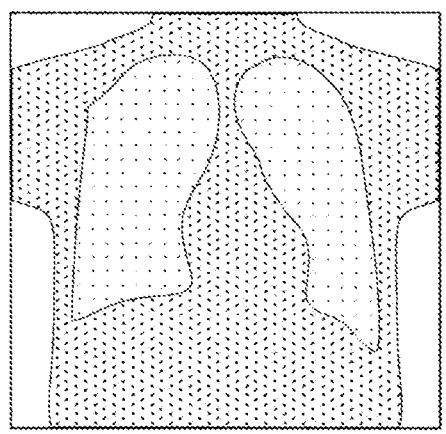
FIG. 51 is a schematic diagram illustrating conventional image processing.
Figure 52:
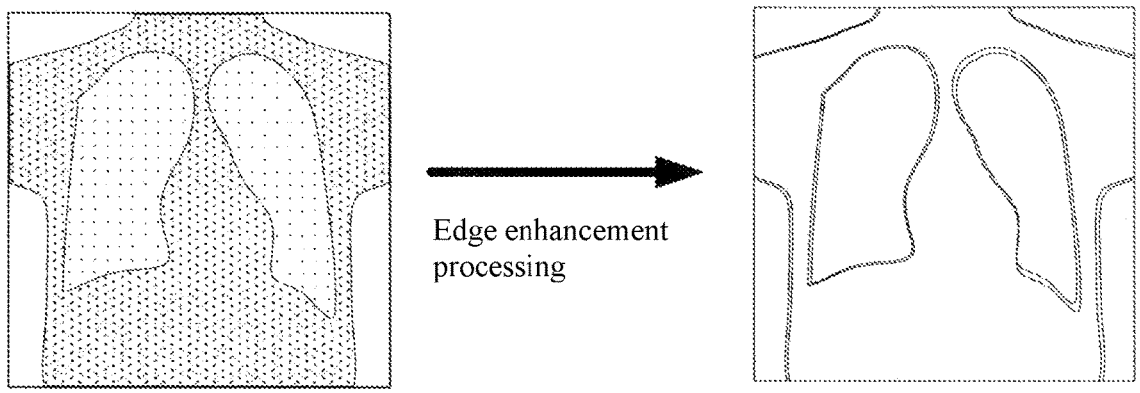
FIG. 52 is a schematic diagram illustrating conventional image processing.
Figure 53:
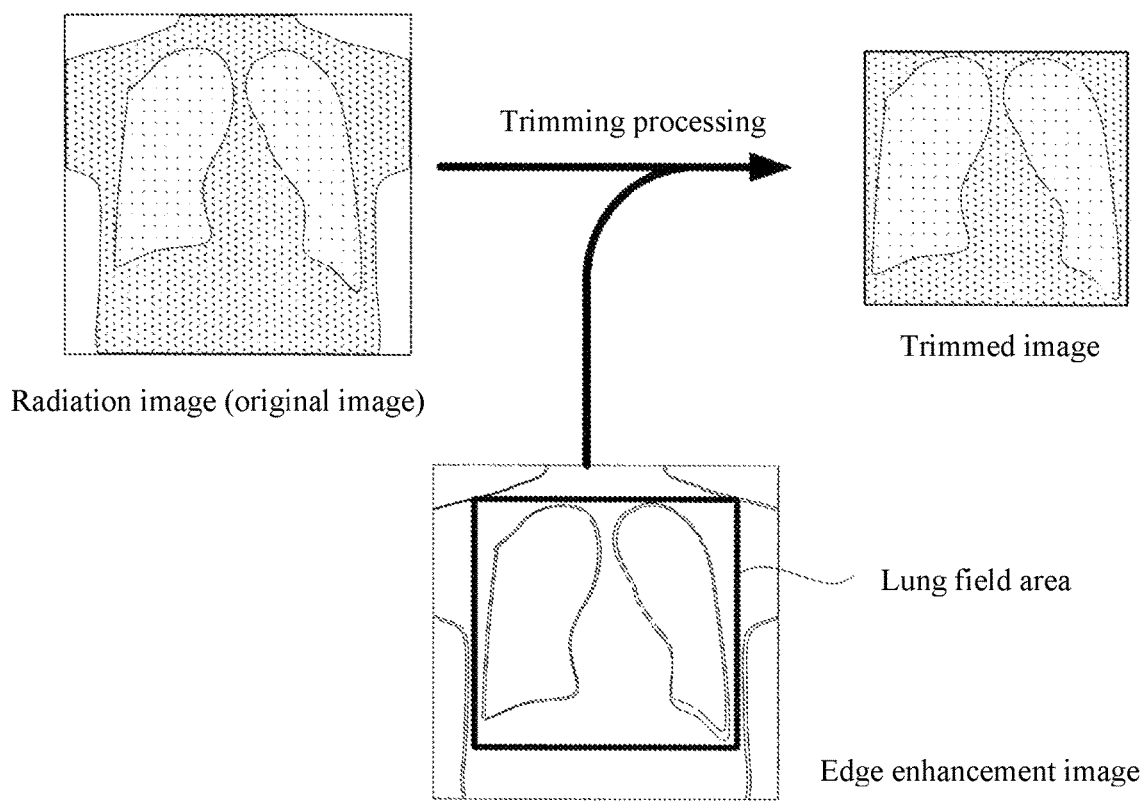
FIG. 53 is a schematic diagram illustrating conventional image processing.
Figure 54:
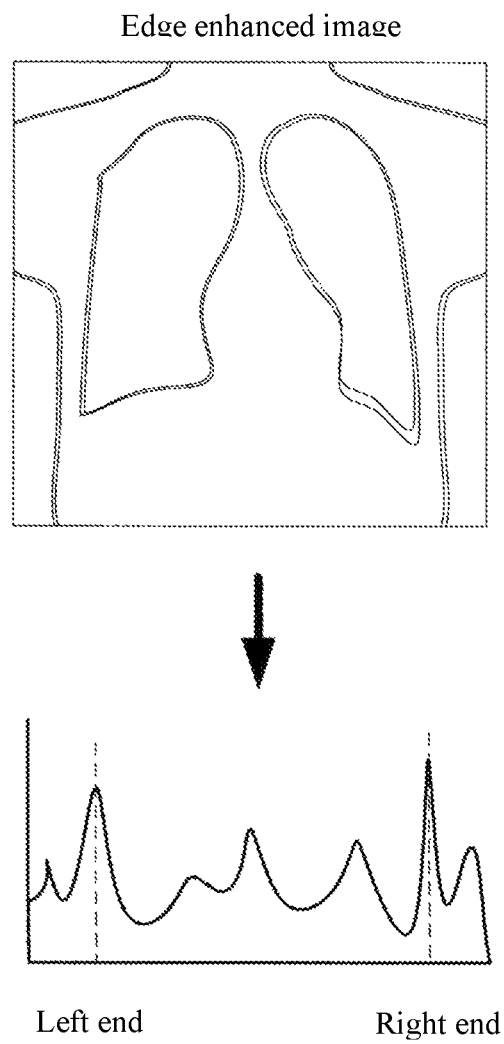
FIG. 54 is a schematic diagram illustrating conventional image processing.
Figure 55:
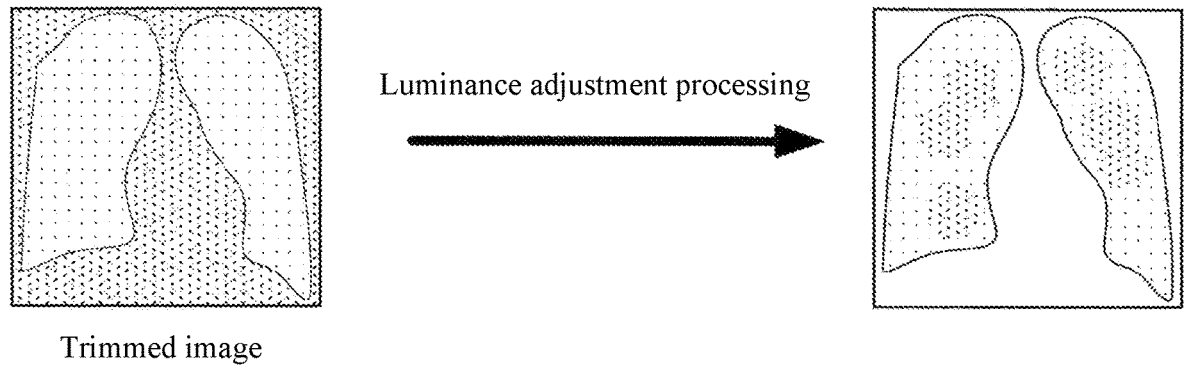
FIG. 55 is a schematic diagram illustrating conventional image processing.
Figure 56:
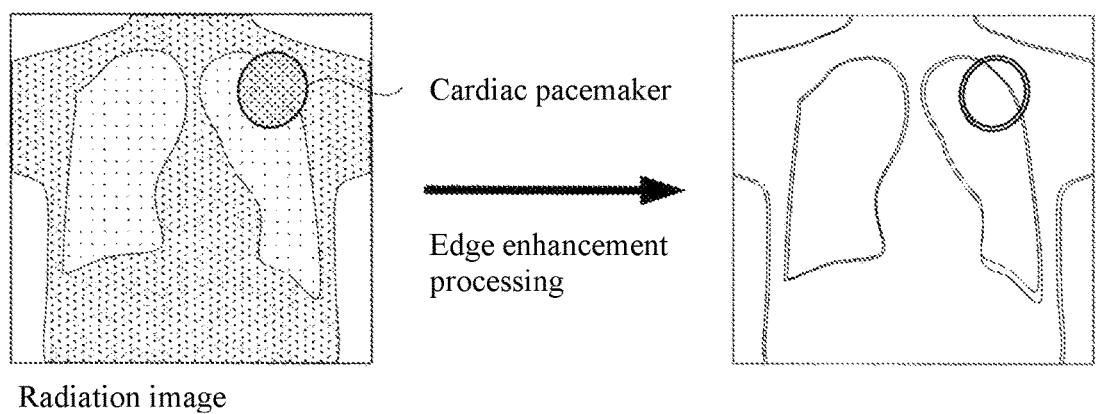
FIG. 56 is a schematic diagram illustrating problems occurring in conventional image processing.
Figure 57:
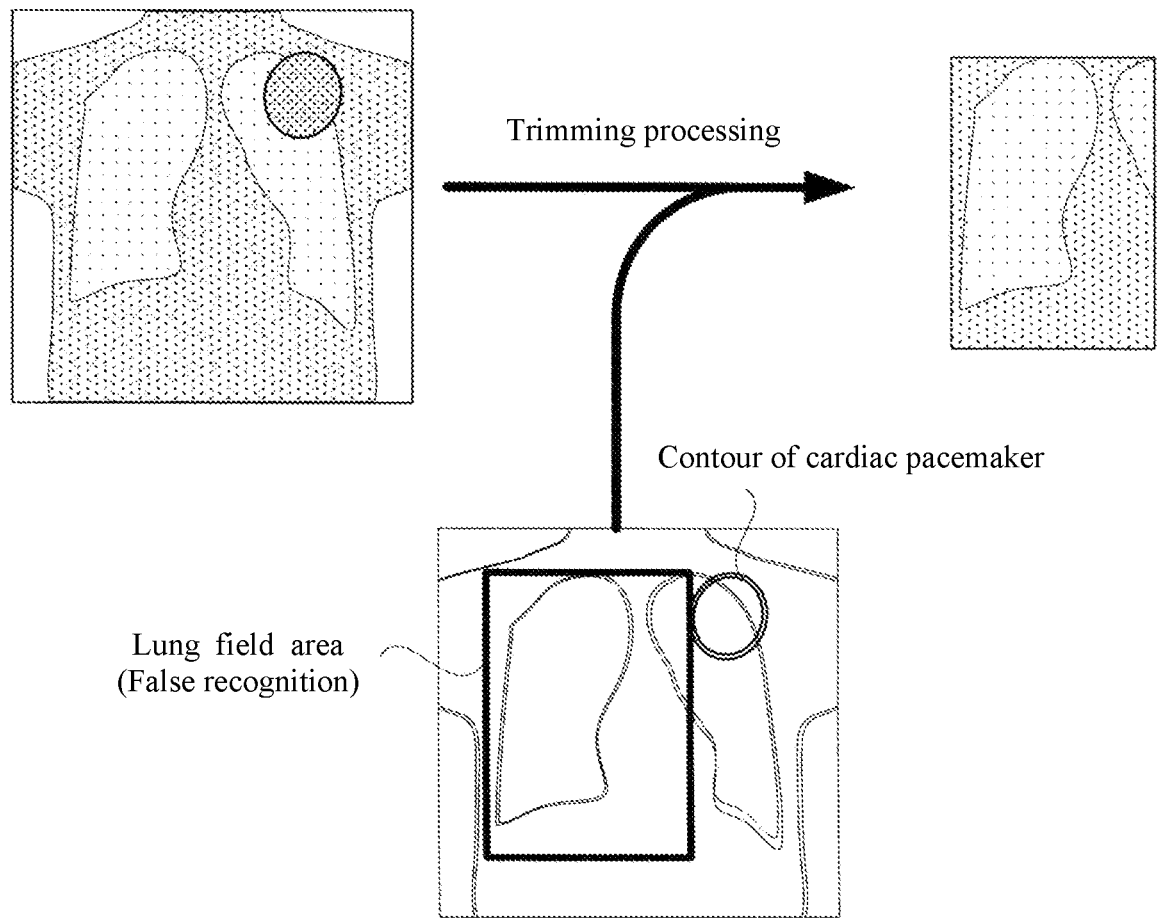
FIG. 57 is a schematic diagram illustrating problems occurring in conventional image processing.

FIG. 50 illustrates the effects of the present invention. According to the method of determining the lung field end portion according to the present invention, no false recognition will occur in the recognition of the end portion of the lung field by the pacemaker or annotation reflected in the original image P0.

FIG. 50 illustrates a case in which a pacemaker is reflected in a pixel column A1 of FIG. 12 and an annotation is reflected in the pixel column A3. Among them, the pixel columns A1 and A2 are pixel columns belonging to a trunk of a body of a subject as shown in the left side of FIG. 12, the pixel column A1 passes through the lung field, and the pixel column A2 is positioned outside the lung field. The pixel column A3 is positioned outside the trunk part of the subject.

In the pixel column A1 of FIG. 50, unlike the case of FIG. 12, the pacemaker is reflected. However, since the bright lung field is sufficiently widely reflected in the pixel column A1 of FIG. 50, the total value of the pixel column A1 does not so change as compared with the one of the pixel column A1 of FIG. 12. In the same manner, in the pixel column A3 of FIG. 50, unlike the case of FIG. 12, the annotation is reflected. However, since the bright air is sufficiently widely reflected in the pixel column A3 of FIG. 50, the total value of the pixel column A3 does not so change as compared with the one of the pixel column A3 of FIG. 12. Therefore, also in FIG. 50, similarly to FIG. 12, the portion of the pixel column A2 is recognized as the end portion of the lung field.

Thus, according to the present invention, even if a pacemaker or an annotation is reflected in the original image P0, no end portion of the lung field will be falsely recognized due to the influence.

As described above, according to the present invention, the visibility of a lung field can be assuredly improved by assuredly recognizing the position of the lung field reflected in the radiation image. That is, according to the present invention, instead of generating a total value profile based on an edge enhanced image like a conventional art, it is configured to generate a total value profile based on a radiation image.

In an edge enhanced image, a contour of a pacemaker and/or a contour of an annotation is very strongly emphasized. Therefore, based on the edge enhanced image, the total value profile is greatly affected by the pacemaker and/or the annotation. This means that the shape of the total value profile greatly changes depending on the presence or absence of the pacemaker and the annotation. The pacemaker and the annotation become a cause of false recognition of the edge of the lung field.

In comparison, according to the present invention, the total value profile is generated based on the radiation image. A pacemaker and an annotation reflected in a radiation image are merely reflected darkly in the image, and the existence is not particularly emphasized by edge enhancement. Therefore, the total value profile according to the present invention is not significantly affected by a pacemaker and/or an annotation. Therefore, according to the present invention, there occurs no false recognition regarding the end of the lung field due to a pacemaker and/or an annotation.

The present invention is not limited to the aforementioned configuration, and may be modified as follows.

(1) The image processing apparatus according to the present invention can also be realized by executing the following processing. That is, software for realizing the functions of the above-described embodiments is supplied to a system or an apparatus via a network or various storage media, and a computer (or CPU, MPU, etc.) of the system or apparatus reads program to execute processing.

(2) The image processing apparatus according to the present invention may be mounted on a radiographic imaging apparatus.

(3) The lateral direction profile generation unit 11X may be configured to recognize that the original image P0 is generated by arranging pixel columns in which pixels are arranged in the lateral direction with the width of one pixel, calculate the average value by averaging the pixel values of pixels belonging to the pixel column extending in the vertical direction for each pixel column, and generate an average value profile which is a profile extending in the lateral direction associated with the position of pixel column and the average value. In this case, each unit 13L, 13R operates by searching the minimum value of this average value profile.

(4) The vertical direction profile generation unit 11Y may be configured to recognize that the image is generated by arranging pixel columns in which pixels are arranged in the vertical direction with the width of one pixel in the vertical direction, calculate the average value by averaging pixel values of pixels belonging to a pixel column extending in the lateral direction for each pixel column, and generate a vertical direction profile which is a profile extending in the vertical direction associated with the position of pixel column and the average value. In this case, each unit 13T, 13U operates by searching the minimum value of this average value profile.

DESCRIPTION OF REFERENCE SYMBOLS

11Y: vertical direction profile generation unit (vertical direction profile generation means)
11X: lateral direction profile generation unit (lateral direction profile generation means)
12L: left side area setting unit (left side area setting means)
12R: right side area setting unit (right side area setting means)
12T: upper side area setting unit (upper side area setting means)
12U: lower side area setting unit (lower side area setting means)
13L: lung field left end recognition unit (lung field left end recognition means)
13R: lung field right end recognition unit (lung field right end recognition means)
13T: lung field upper end recognition unit (lung field upper end recognition means)
13U: lung field lower end recognition unit (lung field lower end recognition means)
14: trimming unit (trimming means)
15: lung field luminance adjustment unit (lung field luminance adjustment means)

The invention claimed is:

1. An image processing apparatus configured to identify a lung field area in a radiation image in which a lung field of a subject is reflected in a vertical direction and air is reflected in an end part of the radiation image, the image processing apparatus comprising:
- one or more processors configured to:
- generate a lateral direction profile for the whole region of the radiation image by adding or averaging pixel values belonging to each pixel column of the radiation image for each pixel column; and
- identify a position where a value of the lateral direction profile becomes minimum in a right side area or a left side area except for the vicinity of a center of a predetermined width from the radiation image as a right end or a left end of the lung field area,
- wherein each pixel column extends in the vertical direction across the entire radiation image, and
- wherein at least some of the pixel columns include the air reflected in the end part of the radiation image.

2. The image processing apparatus as recited in claim 1, wherein
- the predetermined width is a width avoiding vertebras of the subject reflected as a vertically elongated line near the center of the radiation image.

3. The image processing apparatus as recited in claim 1, wherein the one or more processors are configured to
- generate a trimmed image in which an image of the lung field is extracted from the radiation image based on a position of the end of the identified lung field.

4. The image processing apparatus as recited in claim 3, wherein the one or more processors are configured to
- adjust contrast for the trimmed image.

* * * * *